(12) United States Patent
Sugiura

(10) Patent No.: US 8,184,381 B2
(45) Date of Patent: May 22, 2012

(54) LENS DRIVING-CONTROL DEVICE AND IMAGING APPARATUS INCLUDING THE LENS DRIVING-CONTROL DEVICE

(75) Inventor: Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 12/302,077

(22) PCT Filed: May 28, 2007

(86) PCT No.: PCT/JP2007/061230
§ 371 (c)(1),
(2), (4) Date: Nov. 24, 2008

(87) PCT Pub. No.: WO2007/139214
PCT Pub. Date: Dec. 6, 2007

(65) Prior Publication Data
US 2009/0284845 A1    Nov. 19, 2009

(30) Foreign Application Priority Data

May 26, 2006 (JP) .................................. 2006-146121
Aug. 9, 2006 (JP) .................................. 2006-217069

(51) Int. Cl.
*G02B 15/14* (2006.01)
*G02B 15/02* (2006.01)
*G02B 7/02* (2006.01)
*G03B 13/00* (2006.01)

(52) U.S. Cl. ......... 359/697; 359/672; 359/820; 348/347

(58) Field of Classification Search ............... 359/694, 359/819–824, 701, 642, 646–647, 656, 661, 359/663, 666, 672–676, 684, 696–699, 739; 348/347, 358; 398/77–133
See application file for complete search history.

(56) References Cited

U.S. PATENT DOCUMENTS 5,028,773 A * 7/1991 Hata .......................... 250/201.2
(Continued)

FOREIGN PATENT DOCUMENTS

EP  0 679 918 A1  11/1995
(Continued)

OTHER PUBLICATIONS

Extended European Search Report issued Apr. 4, 2011, in Application No. / Patent No. 07744617.7-2217 / 2033034 PCT/JP2007061230.

*Primary Examiner* — Dawayne A Pinkney
(74) *Attorney, Agent, or Firm* — Oblon, Spivak, McClelland, Maier & Neustadt, L.L.P.

(57) ABSTRACT

A lens driving-control device including a plurality of lens groups having variable magnification function, a plurality of lens driving devices each of which being configured to adjustably drive a driving speed of each of the plurality of lens groups, a control device configured to control each of the plurality of lens driving devices to adjust the driving speed of each of the plurality of lens groups, and a plurality of lens position-detecting devices each of which being configured to detect a position of each of the plurality of lens groups, when the plurality of lens driving devices drive the plurality of lens groups simultaneously, the control device being configured to control the lens driving devices to switch driving speeds of the plurality of lens groups to a driving speed of a lens group to be adjusted depending on a positional relationship among the plurality of lens groups, the positional relationship being detected by the lens position-detecting devices.

19 Claims, 14 Drawing Sheets

U.S. PATENT DOCUMENTS

| | | | |
|---|---|---|---|
| 5,202,717 A * | 4/1993 | Ookubo et al. | 396/81 |
| 5,477,298 A * | 12/1995 | Shiina et al. | 396/86 |
| 5,973,857 A | 10/1999 | Kaneda | |
| 6,169,578 B1 | 1/2001 | Chigira | |
| 6,546,202 B1 * | 4/2003 | Onozuka et al. | 396/135 |
| 2004/0263633 A1 | 12/2004 | Shinohara et al. | |
| 2006/0188242 A1 | 8/2006 | Sugiura | |

FOREIGN PATENT DOCUMENTS

| | | |
|---|---|---|
| JP | 5 88070 | 4/1993 |
| JP | 6 14231 | 1/1994 |
| JP | 6 160699 | 6/1994 |
| JP | 11 326739 | 11/1999 |
| JP | 2000 235224 | 8/2000 |
| JP | 2000 275503 | 10/2000 |
| JP | 2002 268126 | 9/2002 |
| JP | 2003 241069 | 8/2003 |
| JP | 2003 280060 | 10/2003 |
| JP | 2004 85964 | 3/2004 |
| JP | 2004 151183 | 5/2004 |
| JP | 2004 151628 | 5/2004 |
| JP | 3761740 | 1/2006 |
| JP | 3779247 | 3/2006 |
| JP | 2006 139294 | 6/2006 |
| JP | 2006 227399 | 8/2006 |
| JP | 2006 330657 | 12/2006 |
| JP | 2007 3612 | 1/2007 |
| JP | 2007 86687 | 4/2007 |

* cited by examiner

FIG.9

LENS DRIVING-CONTROL DEVICE AND IMAGING APPARATUS INCLUDING THE LENS DRIVING-CONTROL DEVICE

CROSS-REFERENCE TO THE RELATED APPLICATIONS

This application is based on and claims the priority benefit of each of Japanese Patent Application No. 2006-146121, filed on May 26, 2006 and Japanese Patent Application No. 2006-217069, filed on Aug. 9, 2006, the disclosure of which is incorporated herein by reference in its entirety.

TECHNICAL FIELD

The present invention relates to a lens driving-control device and an imaging apparatus including the lens driving-control device, more specifically to an improvement in a lens driving-control device to drive and control a plurality of lens groups constituting a zoom lens and an imaging apparatus in which the lens driving-control device is installed.

BACKGROUND ART

When photographing a subject, there has been widely used a camera which includes a photographic lens or so-called zoom lens having variable magnification function to change a magnification ratio of photograph, if necessary. The zoom lens is configured to change a magnification ratio between a telescopic state capable of photographing a faraway subject in an enlarged state and a wide angle state capable of photographing the subject in a wider field angle, by operating a manipulation switch provided in a camera.

The zoom lens is composed of a combination of a plurality of lens groups each of which is formed by one or more lenses. A magnification ratio of the zoom lens is changed by moving each of the plurality of lens groups along an optical axis.

Here, there is known a lens driving-control device including a mechanical device, for example, a cam mechanism to drive the plurality of lens groups simultaneously and a lens driving-control device to drive the cam mechanism by hand and motors (for reference, see Japanese Patent Application Publication No. 06-160699).

However, there is a problem that the lens driving-control device as disclosed in Japanese Patent Application Publication No. 06-160699 has a complicated structure because the mechanical driving mechanism is provided.

On the other hand, it is possible to accomplish a lens driving-control device having a simple structure, which includes a motor provided every each lens group and is configured to drive lens groups independently by corresponding motors.

However, because the plurality of lens groups constituting zoom lens groups are disposed on the same optical axis, and a part of movable range of one of the adjacent lens groups along the optical axis is overlapped with a part of movable range of other lens group, if the lens groups are simultaneously driven, there is possibility that the lens groups interfere depending on an arrangement of the lens groups along the optical axis or driving speed.

On the contrary, in a sequential driving system in which the plurality of lens groups are driven or stopped in sequence from a subject side or image side, there is no fear that the lens groups interfere, but a long time takes between a driving initiation and a driving completion, compared to a case where the plurality of lens groups are simultaneously driven.

Also, because a focus lens group to perform a focus function of an image on an image surface is usually included in the zoom lens, until the drive of the focus lens group is completed, the focused image is not projected on the image surface.

Consequently, when the lens driving-control device of the sequential driving system is applied to a still camera or video camera having a structure for displaying the image projected on a CCD, CMOS or the like on a liquid crystal monitor, there is a problem that it takes a long time at which the image which is not focused is displayed and the camera or the like has no-good usability and attractiveness.

DISCLOSURE OF THE INVENTION

A first object of the present invention is to provide a lens driving-control device capable of simultaneously driving a plurality of lens groups constituting a photographing lens system by a driving device and preventing interference and excessive separation between the lens groups, and an imaging apparatus in which the lens driving-control device is installed.

A second object of the present invention is to provide a lens driving-control device capable of simultaneously driving a plurality of lens groups constituting a photographing lens system by individual driving devices and preventing interference between the lens groups even if a circumferential temperature is low, and an imaging apparatus in which the lens driving-control device is installed.

To accomplish the above-mentioned first object, a lens driving-control device according to one embodiment of the present invention includes a plurality of lens groups having variable magnification function, a plurality of lens driving devices each of which being configured to adjustably drive a driving speed of each of the plurality of lens groups, a control device configured to control each of the plurality of lens driving devices to adjust the driving speed of each of the plurality of lens groups, and a plurality of lens position-detecting devices each of which being configured to detect a position of each of the plurality of lens groups.

When the plurality of lens driving devices drive the plurality of lens groups simultaneously, the control device is configured to control the lens driving devices to switch driving speeds of the plurality of lens groups to a driving speed of a lens group to be adjusted depending on a positional relationship among the plurality of lens groups, the positional relationship being detected by the lens position-detecting devices.

To accomplish the above-mentioned second object, a lens driving-control device according to another embodiment of the present invention includes a plurality of lens groups having variable magnification function, a plurality of lens driving devices each of which being configured to drive each of the plurality of lens groups, a control device configured to control the plurality of lens driving devices to adjust a driving speed of at least one of the plurality of lens groups, a plurality of lens position-detecting devices each of which being configured to detect a position of each of the plurality of lens groups, and a temperature-detecting device configured to measure a circumferential temperature.

When the plurality of lens driving devices simultaneously drive the plurality of lens groups, the control device is configured to vary a driving speed-adjustment threshold based on a measured result of temperature-detecting device when adjusting the driving speed depending on a positional relationship among the plurality of lens groups, which is detected by the lens position-detecting devices.

BRIEF DESCRIPTION OF THE DRAWINGS

FIG. 9 is a schematic view showing a positional relationship of a first and second lens group unit and a third lens group in an optical direction.

BEST MODE FOR CARRYING OUT THE INVENTION

Preferred embodiments for embodying a best mode of the present invention will be explained in detail with reference to the accompanying drawings below.

[First Embodiment]

Figure 1:
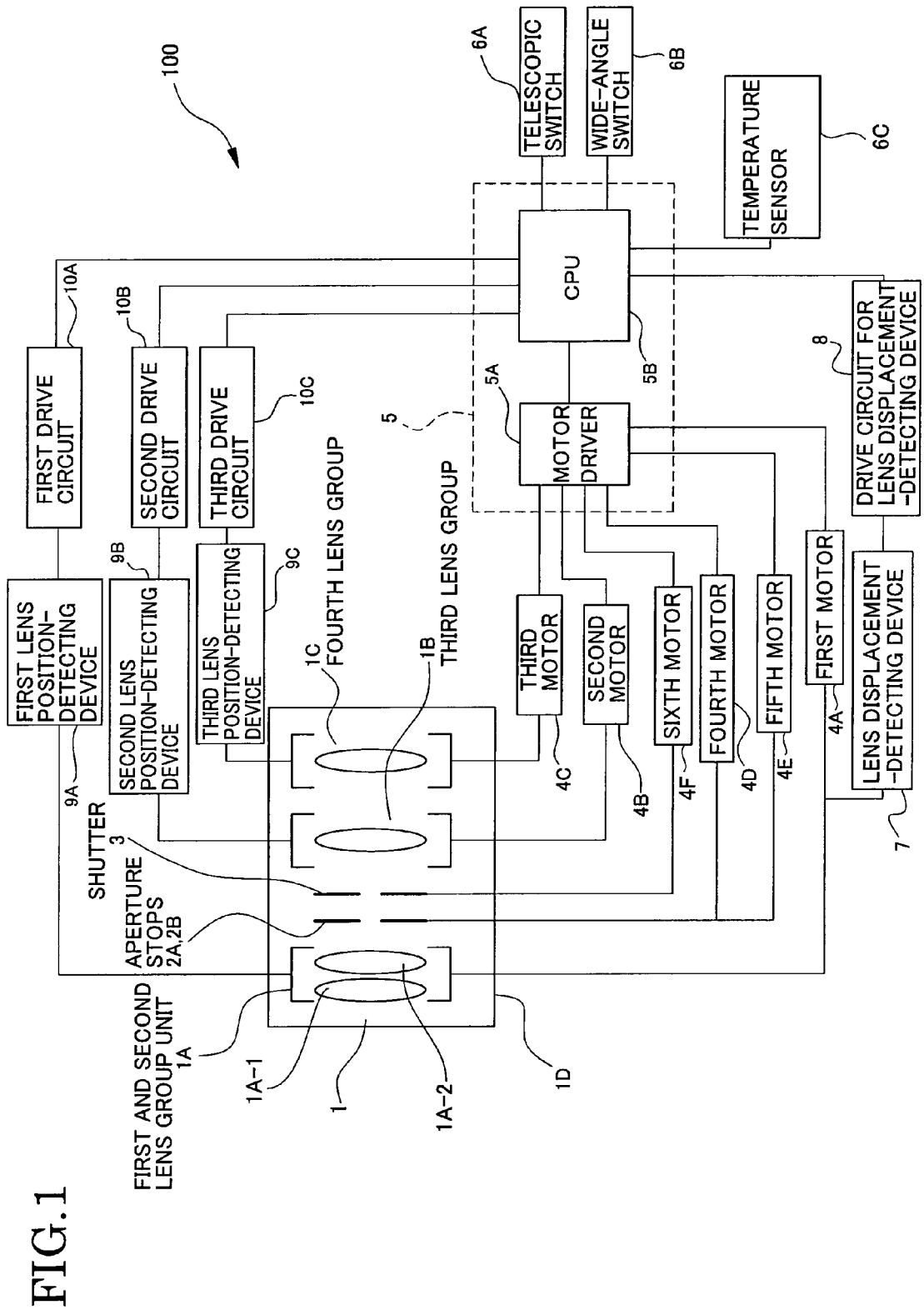
FIG. 1 is a block view showing a lens driving-control device according to each of a first embodiment and a second embodiment of the present invention.

FIG. 1 illustrates a structure of a lens driving-control device 100 according to a first embodiment of the present invention.

The lens driving-control device 100 includes a driving unit configured to drive a photographic lens system 1. The photographic lens system 1 includes a plurality of lens groups, for example, four lens groups of a first lens group 1A-1, a second lens group 1A-2, a third lens group 1B and a fourth lens group 1C which are disposed in turn from a subject (not shown). The first and second lens groups 1A-1 and 1A-2 are integrated to form a first and second lens group unit 1A which serves as an objective lens. Here, each of the plurality of lens groups comprises a plurality of lenses.

The first and second lens group unit 1A, the third lens group 1B and the fourth lens group 1C have a common optical axis and are disposed in a barrel 1D.

The photographic lens system 1 also includes a first aperture stop 2A and a second aperture stop 2B, and a shutter 3, which are disposed between the first and second lens group unit 1A and the third lens group 1B (see FIG. 1). The first and second aperture stops 2A and 2B are configured to control an amount of light passing through the photographic lens 1 from the subject, and the shutter 3 controls an exposure time when photographing the subject.

In the embodiment, the first and second lens group unit 1A and the third lens group 1B constitute zoom lens groups to allow a photographic magnification power to change, and the fourth lens group 1C constitutes a focus lens group to focus an image of the subject on an exposure surface (not shown) positioned behind the fourth lens group 1C.

The driving unit configured to drive the photographic lens system 1 comprises a plurality of lens driving devices, for example, a plurality of motors. The motors comprise a first motor 4A to drive the first and second lens group unit 1A, a second motor 4B to drive the third lens group 1B, a third motor 4C to drive the fourth lens group 1C, a fourth motor 4D to drive the first aperture stop 2A, a fifth motor 4E to drive the second aperture stop 2B, and a sixth motor 4F to drive the shutter 3 (see FIG. 1). In respect that, the first motor is, for example, a direct current (DC) motor, and the second motor 4B to drive the third lens group 1B and the third motor 4C to drive the fourth lens group 1C is, for example, a pulse motor.

Meanwhile, a transmission mechanism to connect the photographic lens system 1 and the first to sixth motors 4A to 4F is omitted because a known transmission mechanism can be used.

A driving speed of the DC motor 4A can be changed depending on a driving voltage applied. Therefore, a driving speed of the first and second lens group unit 1A can be adjusted by a simple operation of only changing the applied voltage.

Meanwhile, generally, rotation of a DC motor is higher than that of a pulse motor, if the motors have the same supplying power. Because the DC motor has a characteristic in which a driving current changes depending on variation of a load, the driving current increases as the load increases. Therefore, the DC motor has a high driving torque to acquire smooth driving having resistance to load variation.

If the above-mentioned transmission mechanism to connect the photographic lens system 1 and the first to sixth motors 4A to 4F comprises, for example, a cam device including a cam and a cam cylinder engaged with the cam, in which an inclination of the cam or load torque changes depending on a zoom position of the photographic lens system 1, because the DC motor has the high driving torque as mentioned above, it is suitable to use the DC motor to drive the cam device.

In addition, a driving speed of the DC motor changes depending on a duty ratio or ratio of time in an ON state occupying in a period and can adjust the driving speed of the first and second lens group unit 1A by a simple operation of only changing a ratio of a power applying-driving time input in the DC motor.

On the other hand, in case of stopping the DC motor, there is generated a time lag or overrun from a time at which control for stopping the DC motor is made to a time at which the DC motor is actually stopped, by an inertia, and therefore it is difficult to stop the DC motor in a desired position. In that respect, the pulse motor is easy to stop in any target position, because the pulse motor is configured to be driven by supplying pulses, but it has no resistance to torque variation, therefore, and hence it is suitable to use the pulse motor to control a device having a less torque variation.

The first to sixth motors 4A to 4F are electrically connected to a motor driver 5A which is connected to a CPU (central processing unit) 5B and configured to be intensively controlled by the motor driver 5A and the CPU 5B (see FIG. 1).

The motor driver 5A inputs information, for example, a drive voltage, a drive timing, a driving amount, a driving direction or the like, necessary to drive and control the first to sixth motors 4A to 4F from the CPU 5B and drives and controls the motors 4A to 4F based the input information.

Here, the first motor 4A is connected to a lens displacement-detecting device 7 to detect an amount of movement of the first and second lens group unit 1A.

The lens displacement-detecting device 7 generates a pulse number based on a rotation number of the first motor 4A.

Electrically connected to the lens displacement-detecting device 7 is a drive circuit 8 for the lens displacement-detecting device, which is configured to drive the lens displacement-detecting device 7 (see FIG. 1).

The pulse output from the lens displacement-detecting device 7 is input in the CPU 5B.

The lens displacement-detecting device 7 is set to output a predetermined number of pulses such as 1280 numbers between the most telescopic state and the widest angle state of the photographic lens system 1.

All sections between the most telescopic state and the widest angle state of the photographic lens system 1 are equally divided into predetermined numbers, for example, 16 (one equal division per 80 pulses), and positional marks, that is to say, zoom positions Zp1, Zp2, . . . , Zp17 are attached to 17 separations of the 16 sections.

Figure 2:
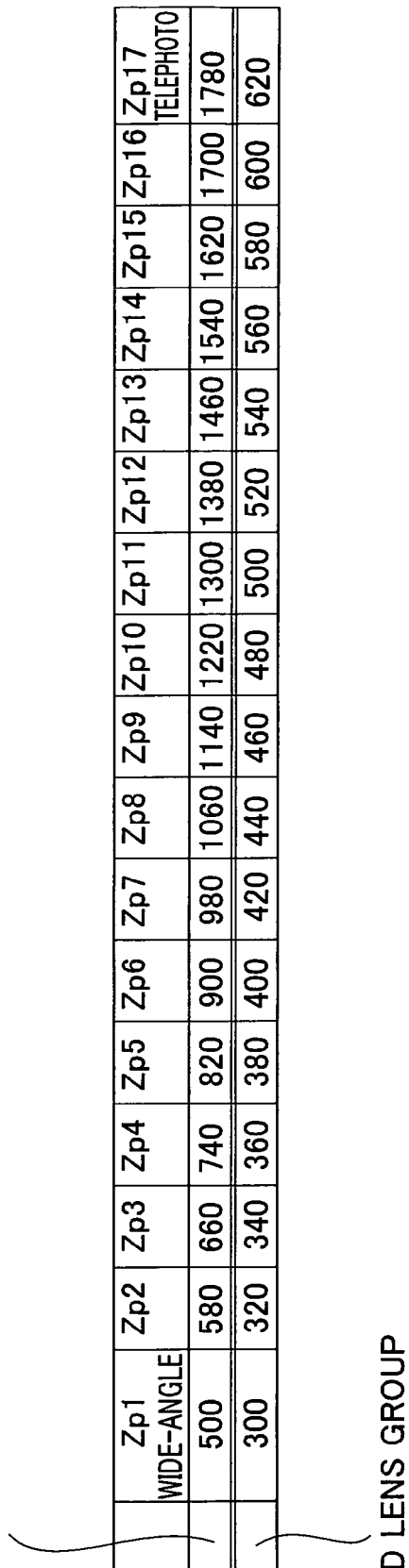
FIG. 2 is a table showing positional information of lenses in the lens driving-control device as shown in FIG. 1.
Figure 13:
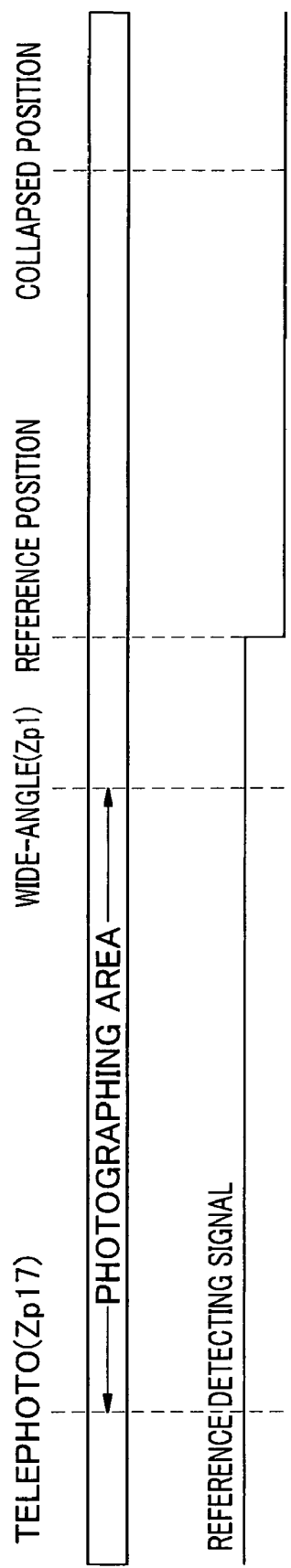
FIG. 13 is an explanatory view showing a relationship between a reference position and a zoom position.

Here, FIG. 2 illustrates a relationship an output pulse of the lens displacement-detecting device 7 and each of the zoom positions Zp1, Zp2, . . . , Zp17. FIG. 13 illustrates a positional relationship among a reference position, the zoom positions and a collapsed position of the photographing lens system 1.

The pulse numbers shown in FIG. 2 are counted as the reference position being zero (0). When going from the reference position to the collapsed position, the pulse numbers are counted with minus values.

On the other hand, the first to third motors 4B and 4C are driven by driving speeds based on the pulse numbers input by the motor driver 5A in accordance with a command of the CPU 5B.

Here, input pulse numbers to the second motor 4B necessary to dispose the third lens group 1B in each of the zoom positions Zp1 to Zp17 are set as shown in FIG. 2.

Meanwhile, a position of the fourth lens group 1C is omitted because it is the focus lens group.

The first and second lens group unit 1A, the third lens group 1B and the fourth lens group 1C are connected to a first lens position-detecting device 9A, a second lens position-detecting device 9B and a third lens position-detecting device 9C, respectively (see FIG. 1) which are configured to detect their reference positions. The first lens position-detecting device 9A, the second lens position-detecting device 9B and the third lens position-detecting device 9C detect whether the first and second lens group unit 1A, the third lens group 1B and the fourth lens group 1C are in the their reference positions.

The first lens position-detecting device 9A, the second lens position-detecting device 9B and the third lens position-detecting device 9C are connected to a first drive circuit 10A to drive the first lens position-detecting device 9A, a second drive circuit 10B to drive the second lens position-detecting device 9B and a third drive circuit 10C to drive the third lens position-detecting device 9C, respectively.

The first drive circuit 10A, the second drive circuit 10B and the third drive circuit 10C are connected to the CPU 5B (see FIG. 1). The CPU 5B controls the first drive circuit 10A, the second drive circuit 10B and the third drive circuit 10C to drive first lens position-detecting device 9A, the second lens position-detecting device 9B and the third lens position-detecting device 9C, and is configured to input positions detected by the first lens position-detecting device 9A, the second lens position-detecting device 9B and the third lens position-detecting device 9C.

A telescopic switch 6A to operate a high magnification power of the photographing lens system 1 in case of performing telescopic photograph and a wide-angle switch 6B to operate a low magnification power of the photographing lens system 1 in case of performing wide-angle photograph are electrically connected to the CPU 5B (see FIG. 1). The CPU 5B controls the first motor 4A, the second motor 4B and the third motor 4C depending on the operation of the telescopic switch 6A and the wide-angle switch 6B.

It is noted that the motor driver 5A and the CPU 5B constitute a control device 5 (see FIG. 1).

The first lens group 1A-1 and the second lens group 1A-2 constituting the first and second lend group unit 1A are attached to the cam cylinder of the above-mentioned cam device so that an interval between the first lens group 1A-1 and the second lens group 1A-2 is mechanically adjusted. More specifically, the first lens group 1A-1 and the second lens group 1A-2 are driven so that the first lens group 1A-1 and the second lens group 1A-2 have a predetermined interval therebetween, when the first and second lens group unit 1A is driven by the first motor 4A.

Connected to the CPU 5B is a temperature measuring device which comprises a temperature sensor 6C (see FIG. 1). The temperature sensor 6C outputs a different voltage value every a temperature and the CPU 5B coverts the voltage value in A/D (analog-digital). The temperature sensor 6C in this embodiment has a characteristic in which the voltage of 10 mV per 1° C. varies, therefore it is possible to grasp a now temperature by storing a voltage value at any temperature.

In other words, when the first to third motors 4A, 4B and 4C drive the first and second lens group unit 1A, the third lens group 1B and the fourth lens group 1C simultaneously, the control device 5 allows a limitation value to adjust the drive speed to differ according to measured results of the temperature sensor 6C when adjusting the drive speed of each of the first and second lens group unit 1A, the third lens group 1B and the fourth lens group 1C depending on a positional relationship among the first and second lens group unit 1A, the third lens group 1B and the fourth lens group 1C detected by the first to third lens position-detecting devices 9A, 9B and 9C. Here, the meaning of "driving the lens groups simultaneously" is not that all period from a driving initiation to a driving completion of each of the lens groups coincides. This means that at least one portion period (may be all periods) of the periods where the lens groups are driven is overlapped.

Figure 3:
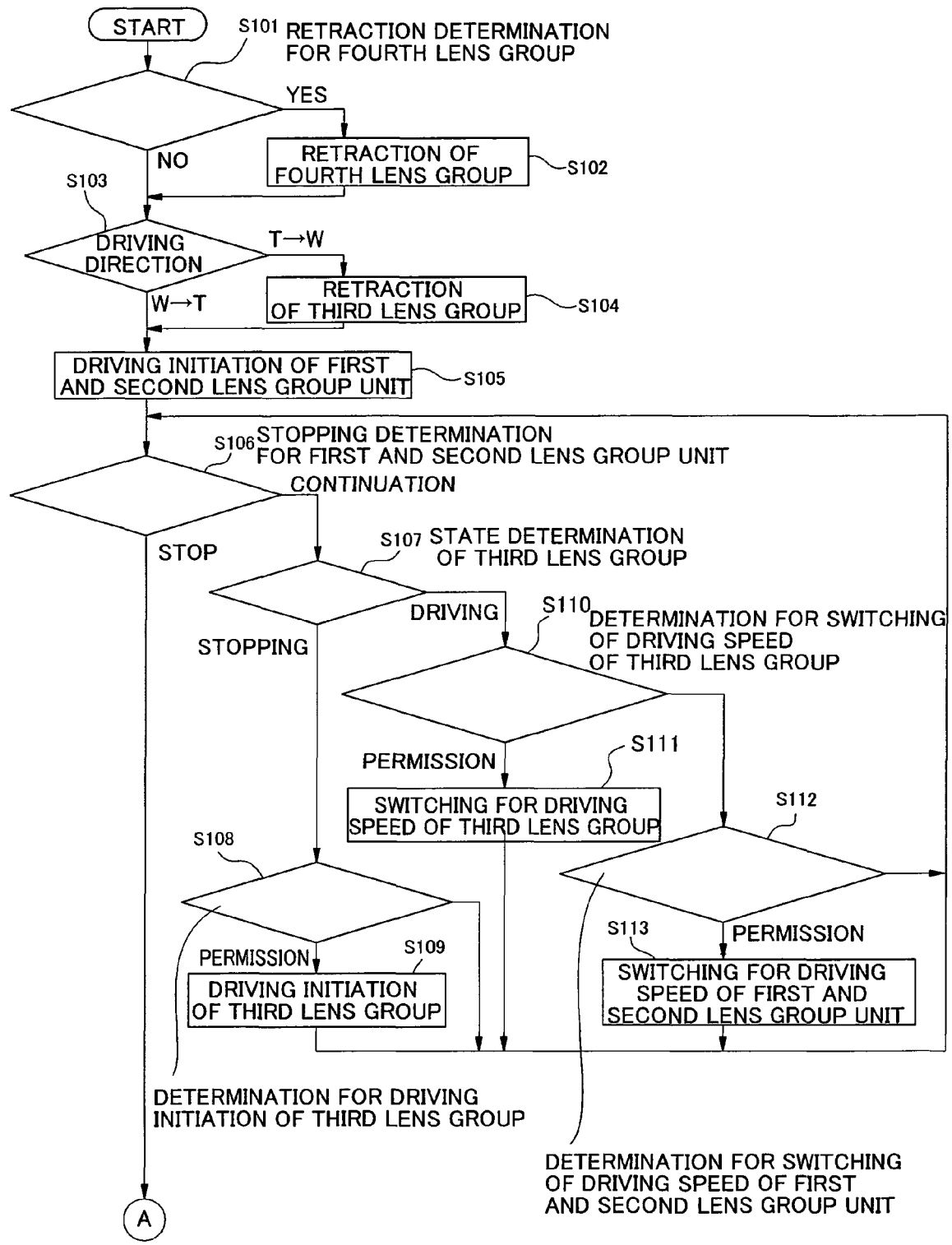
FIG. 3 is a flow chart showing a processing content in the lens driving-control device as shown in FIG. 1.
Figure 9:
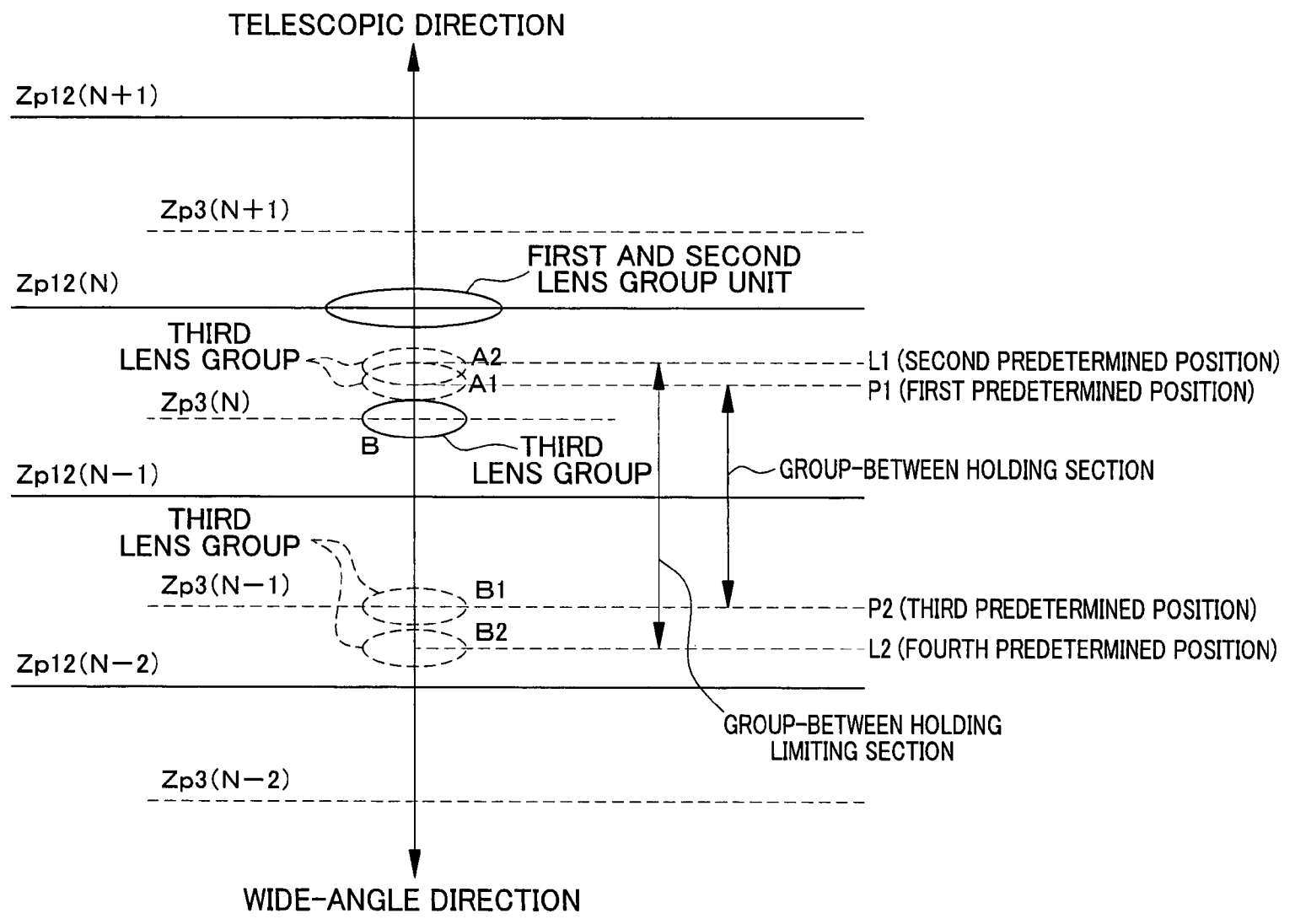

Next, basic operation of the first embodiment of the present invention is mentioned with reference to a flow chart of FIG. 3, timing charts of FIGS. 5 to 8 and an operational explanatory view of FIG. 9.

A driving-control method in the first embodiment is configured to vary the driving speed of the first motor 4A by increasing and decreasing a voltage applied to the first motor 4A depending on a position of the third lens group 1B relative to a position of the first and second lens group unit 1A, and drive the first and second lens group unit 1A and the third lens group 1B simultaneously so that the first and second lens group unit 1A and the third lens group 1B do not interfere.

Here, because the driving-control method has a different flow depending on whether the photographing lens system 1 is driven from the telescopic state to the wide-angle state or the photographing lens system 1 is driven from the wide-angle state to the telescopic state, descriptions of a case where the photographing lens system 1 is driven from the telescopic state to the wide-angle state and a case where the photographing lens system 1 is driven from the wide-angle state to the telescopic state, are made as follows.

(From the Wide-Angle State to the Telescopic State)

A driving-control method of a case where the photographing lens system 1 is driven from the wide-angle state to the telescopic state is explained.

Figure 4:
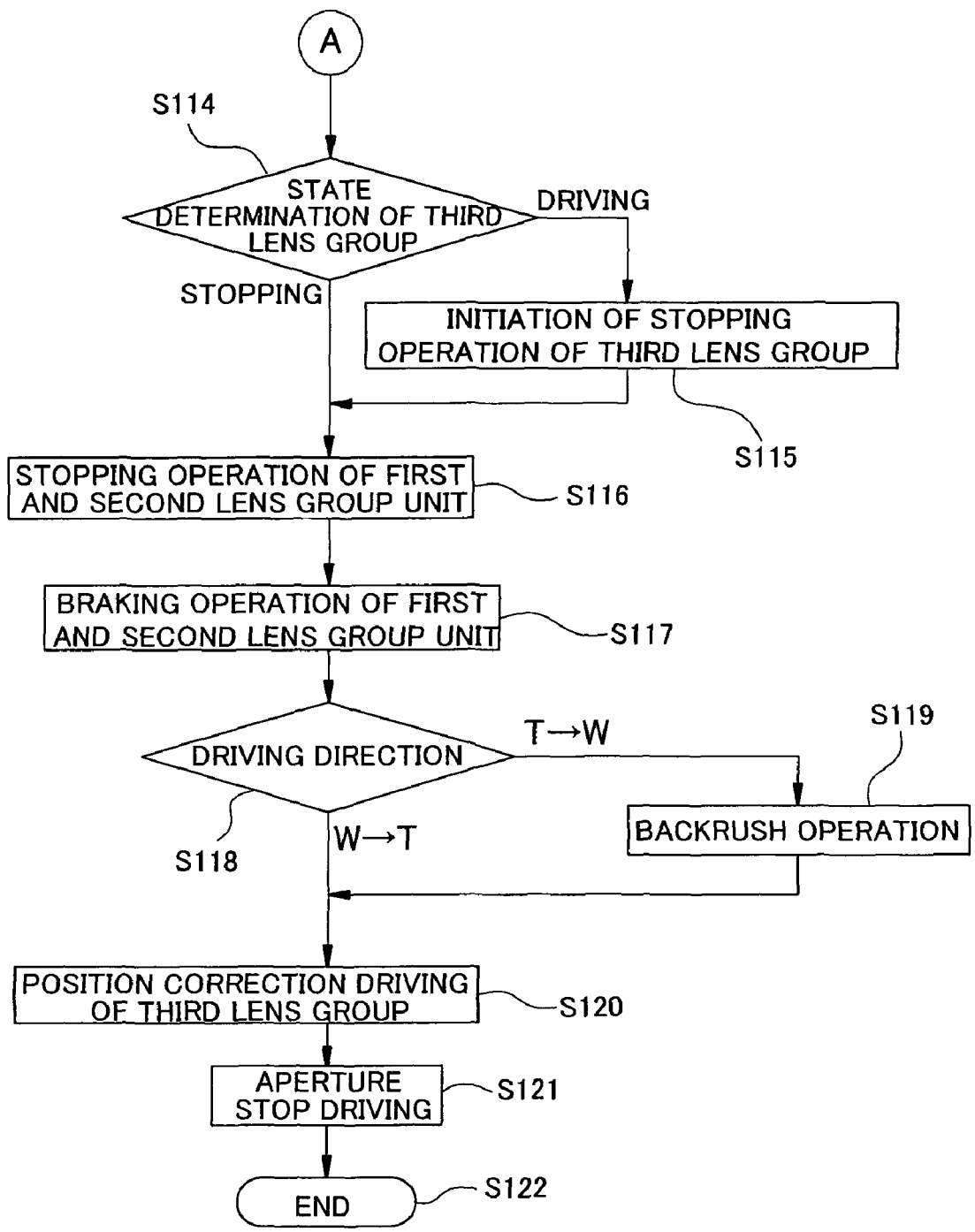
FIG. 4 is a flow chart showing another processing content in the lens driving-control device as shown in FIG. 1.

FIGS. 3 and 4 illustrate zoom operation when the driving-control operation is made.

In step S 101, to determine the necessity driving the fourth lens group 4C, whether the photographing lens system 1 is driven from the telescopic state to the wide-angle state or the photographing lens system 1 is driven from the wide-angle state to the telescopic state (telephoto) is determined.

If a user presses the telescopic switch 6A which drives the photographing lens system 1 from the wide-angle state to the telescopic state and the photographing lens system 1 is driven from the wide-angle state to the telescopic state (referred to as W→T in FIGS. 3 and 4), because the first to fourth lens groups are driven in a direction separating from each other, it is not required to perform the driving-control to retract the fourth lens group 1C from the optical axis. Next, the flow proceeds to step S 103.

In the step S103, to determine the necessity of the driving-control to retract the third lens group 4B, whether the photographing lens system 1 is driven from the telescopic state to the wide-angle state or the photographing lens system 1 is driven from the wide-angle state to the telescopic state is determined.

If the user presses the telescopic switch 6A which drives the photographing lens system 1 from the wide-angle state to the telescopic state and the photographing lens system 1 is driven from the wide-angle state to the telescopic state, because the first to fourth lens groups are driven in a direction separating from each other, as mentioned above, it is not necessary to perform the driving-control to retract the third lens group 1B from the optical axis, then the flow proceeds to step S 105.

In the step S105, the drive of the first and second lens group unit 1A is initiated by the first motor 4A by the telescopic switch 6A being pressed.

Figure 5:
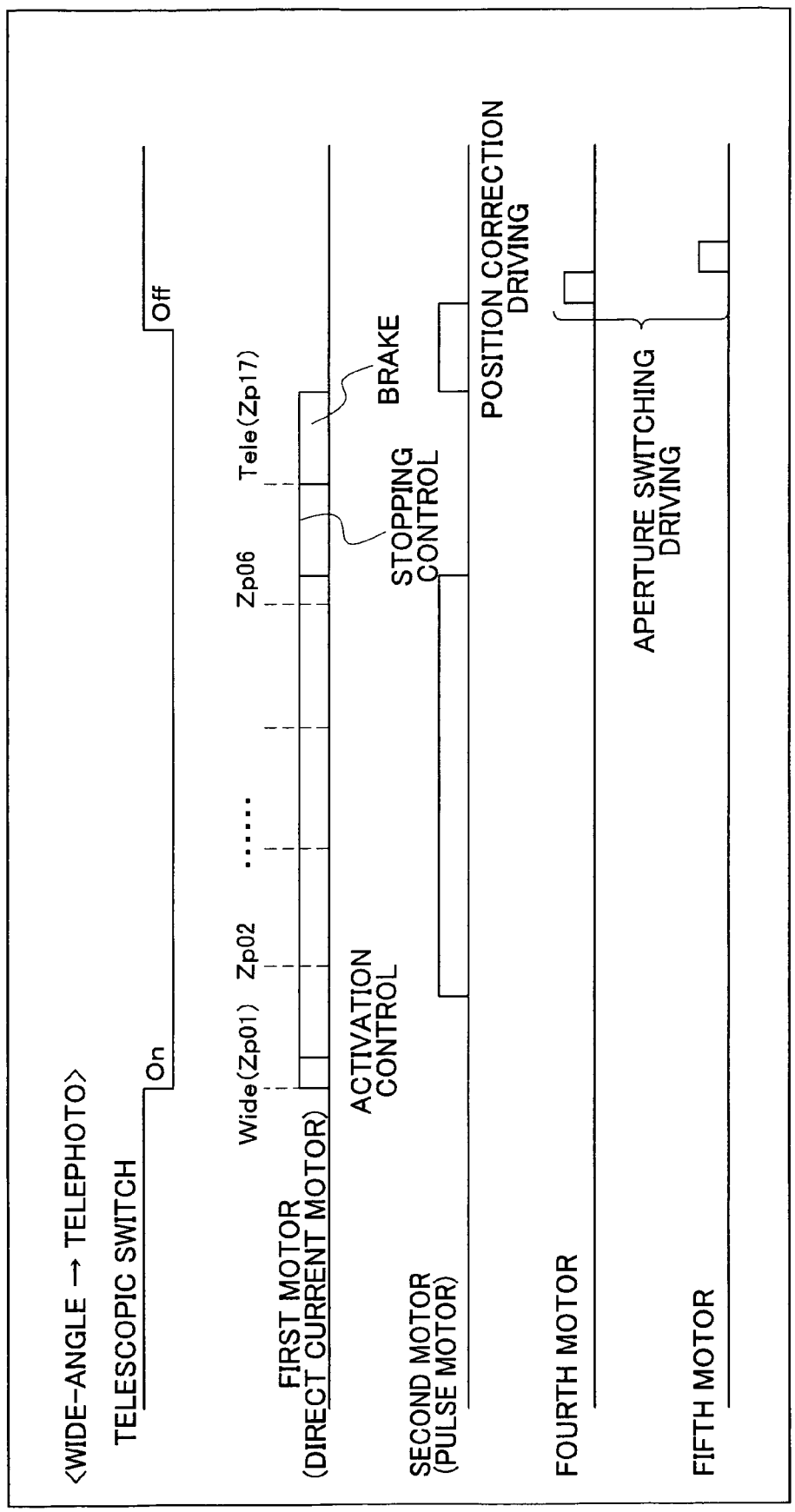
FIG. 5 is a timing cart showing a case where a photographing lens system is zoomed-in from a wide-angle to a telephoto.
Figure 6:
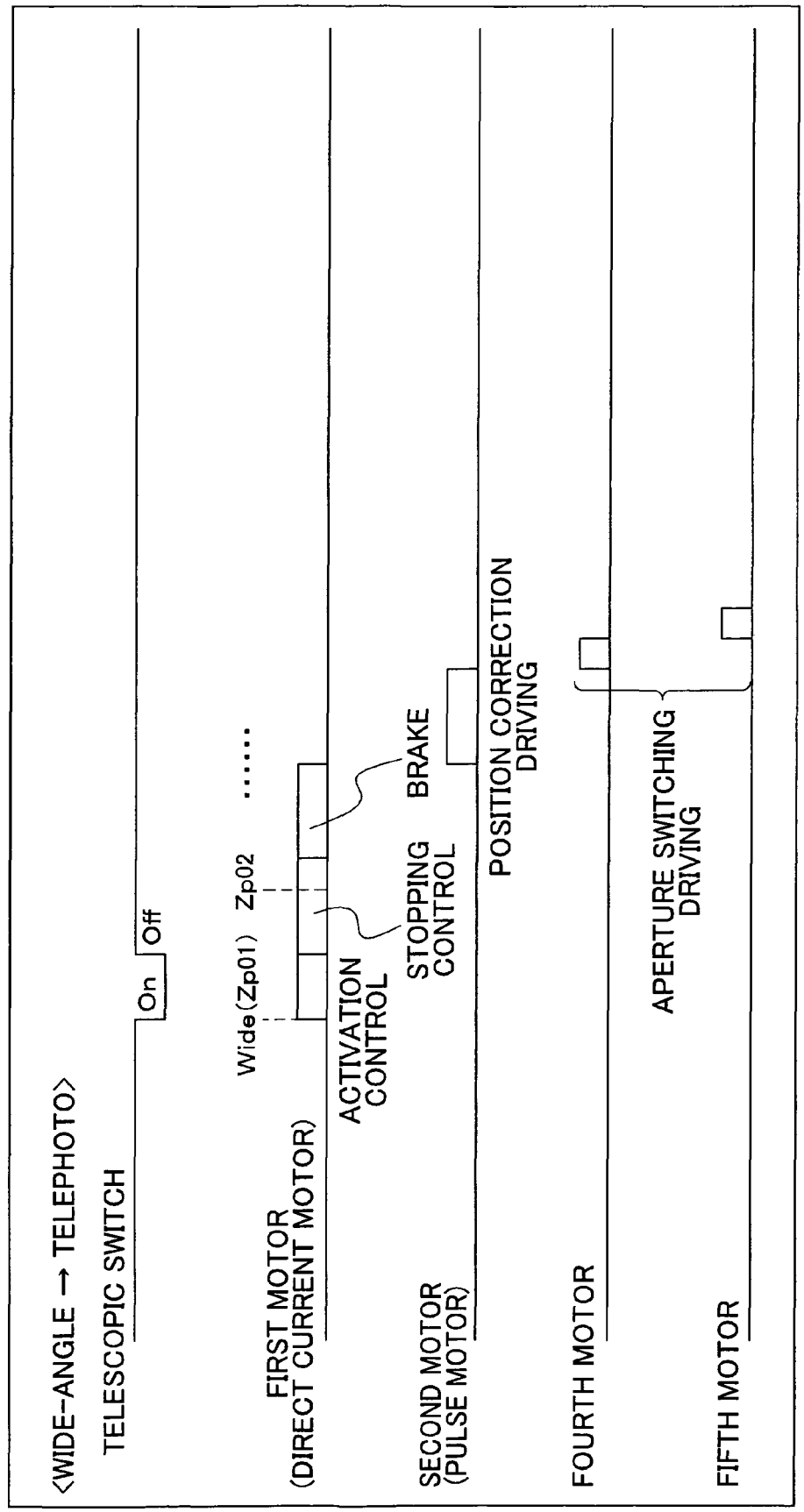
FIG. 6 is a timing cart showing a case where operation of a telephoto switch is temporarily interrupted when the photographing lens system is zoomed-in from the wide-angle to the telephoto.

Here, because the first motor 4A is the DC motor, just after its drive is initiated, an incoming current occurs in the motor to reduce a voltage of a power source, whereby affecting an operating life of a battery. To avoid this, it is preferably to set the driving voltage of the first motor 4A to be a lower value than a steady driving voltage just after the drive of the first and second lens group unit 1A is initiated and control to raise the lower voltage to the steady driving voltage after a predetermined time lapses (see timing charts of FIGS. 5 and 6 showing the operation of the telescopic switch 6A and the first motor 4A).

Meanwhile, a driving voltage between the telescopic position and the wide-angle position is set to be lower than a driving voltage between the wide-angle position and the collapsed position of the photographing lens system 1.

This is for the reason that a high voltage is set to the photographing lens system because a high speed drive of the photographing lens system is demanded between the wide-angle position and the collapsed position, and an appropriate voltage is set to the photographing lens system because the drive of the photographing lens system is rapidly stopped at a target position by the operation of the telescopic switch 6A and the wide-angle switch 6B between the telescopic position and the wide-angle position.

In step S 105, after the drive of the first and second lens group unit 1A is initiated, the flow proceeds to step S 106, a determination whether the first and second lens group unit 1A is required to stop is made in the step S 106.

Here, if it is necessary to stop the first and second lens group unit 1A, in other words, if the telescopic switch 6A is not pressed (in FIG. 6, a time point that the telescopic switch 6A is OFF), or the first and second lens group unit 1A is moved to a position of predetermined distance before the most telescopic position (in FIG. 5, a time point that the stop control of the first motor 4A is initiated), the flow proceeds to step S 114. On the other hand, if it is not necessary to stop the first and second lens group unit 1A, the flow proceeds to step S 107.

In step S 107, it is determined whether the third lens group 1B is under the stopping or driving. Here, if the third lens group is under the stopping, the flow proceeds to step S 108. On the other hand, if the third lens group is under the driving, the flow proceeds to step S 110.

In step S 108, in order to provide a time difference between a driving-initiation timing of the first and second lens group unit 1A and a driving-initiation timing of the third lens group 1B, it is determined whether a predetermined time after the drive of the first and second lens group unit 1A is initiated lapses.

By providing the time difference between the driving-initiation timing of the first and second lens group unit 1A and the driving-initiation timing of the third lens group 1B, it is not necessary for the power source to supply a great deal of current consumption in a short time because the driving current of the third lens group 1B is not overlapped on an incoming current timing occurring when initiating the drive of the first motor 4A. With such a structure, it is possible to accomplish a long life of the battery which is the power source. The lapse of the predetermined time is determined by counting the pulse number output from the lens displacement-detecting device 7 until a predetermined pulse number is obtained.

In step S108, if a predetermined time lapses after the drive of the first and second lens group unit 1A is initiated, the flow proceeds to step S109. On the other hand, if a predetermined time does not lapse after the drive of the first and second lens group unit 1A is initiated, the flow is returned to step S106 and the above-mentioned flow is repeated.

In step S 109, the drive of the third lens group 1B is initiated by the second motor 4B. At this time, the driving speed of the third lens group 1B is set to be a predetermined speed in which, for example, an input pulse rate of the third lens group 1B is 600 pps (pulse number per 1 second). Thereafter, the flow is returned to step S106.

In step S107, if the third lens group 1B is driving, the flow proceeds to step S110.

In step S110, in order to avoid interference and excessive divergence or separation of the first and second lens group unit 1A and the third lens group 1B, a position of the third lens group 1B to the first and second lens group unit 1A is checked and it is determined whether the driving speed of the third lens group 1B is changed.

Also, a determination for a temperature is made, if the determination of a low temperature (0° C. or less) is made, a driving speed-limit value of the third lens group is used for a low temperature. In the embodiment, the driving speed is adjusted by a driving pulse rate, and a driving speed-limit value of the third lens group 1B corresponds to the maximum driving pulse rate value. In the embodiment, the maximum driving pulse rate at a normal temperature is 1200 pps and the maximum driving pulse rate at a lower temperature is 1000 pps.

Here, as shown in FIG. 9, if the position of the third lens group 1B to the first and second lens group unit 1A exceeds a first predetermined position P1 and approaches the first and second lens group unit 1A (a dotted line portion A1 in FIG. 9), or exceeds a third predetermined position P2 and is remote from the first and second lens group unit 1A (a dotted line portion B1 in FIG. 9), the change of the driving speed of the third lens group 1B is required, the flow proceeds to step S111.

On the other hand, if the position of the third lens group 1B to the first and second lens group unit 1A exists between P1 and P2, the change of the driving speed of the third lens group 1B is not required, the flow is returned to step S 106. Hereinafter, an interval between P1 and P2 is referred to as a group-between-holding section.

In step S 111, if the position of the third lens group 1B to the first and second lens group unit 1A exceeds the first predetermined position P1 and approaches the first and second lens group unit 1A (the dotted line portion A1 in FIG. 9), because there is possibility that the interference of the first and second lens group unit 1A and the third lens group 1B occurs, the driving speed of the third lens group is reduced by a predetermined amount to avoid the interference.

Also, if the position of the third lens group 1B to the first and second lens group unit 1A exceeds the third predetermined position P2 and is remote from the first and second lens group unit 1A (the dotted line portion B1 in FIG. 9), because there is possibility that a distance between the first and second lens group unit 1A and the third lens group 1B is excessively increased, the speed of the third lens group 1B is increased by a predetermined amount to avoid the excess divergence or separation of the first and second lens group unit and the third lens group.

An appropriate amount of each of acceleration and slowdown of the photographing lens system 1 is computed by the CPU 5 based on the driving speed of the first and second lens group unit 1A, a position of the first and second lens group unit 1A detected by the lens displacement-detecting device 7, and a position of the third lens group 1B computed by the input pulse of the second motor 4B.

As shown in FIGS. 2 and 9, a zoom position Zp3 (N) of the third lens group 1B configured to form a predetermined magnification ratio relative to a zoom position Zp12 (N) of the first and second lens group unit 1A is previously set.

Here, the position P1 of the third lens group 1B which initiates the slowdown of the third lens group 1B is set to be a position close to the next zoom position Zp3 (N+1) of the third lens group 1B from the zoom position Zp3 (N) of the third lens group 1B by ⅓ between the zoom position Zp3 (N) of the third lens group 1B and the next zoom position Zp3 (N+1) of the third lens group 1B.

That is to say, the following equation is satisfied.

$$P1 = Zp3(N) + (Zp3(N+1) - Zp3(N))/3$$

On the other hand, the position P2 of the third lens group 1B which initiates the acceleration of the third lens group 1B is set to be a position close to a zoom position Zp3 (N−1) which is the one step short of the zoom position Zp3 (N) of the third lens group 1B.

That is to say, the following equation is satisfied.

$$P2 = Zp3(N-1)$$

When representing the positions P1 and P2 by the output pulse to the second motor 4B as shown in FIG. 2, if the zoom position of the third lens group 1B is Zp3 (4) (N=4), the following equation is satisfied.

$$P1 = 360 + (380 - 360)/3 = 366$$

$$P2 = 340$$

In other words, in a case where the zoom position of the first and second lens group unit 1A is Zp (4) (N=4), if the output pulse to the second motor 4B is 366 or more, the driving speed of the third lens group 1B is deaccelerated, on the contrary, if the output pulse to the second motor 4B is 334 or less, the driving speed of the third lens group 1B is accelerated.

Figure 10:
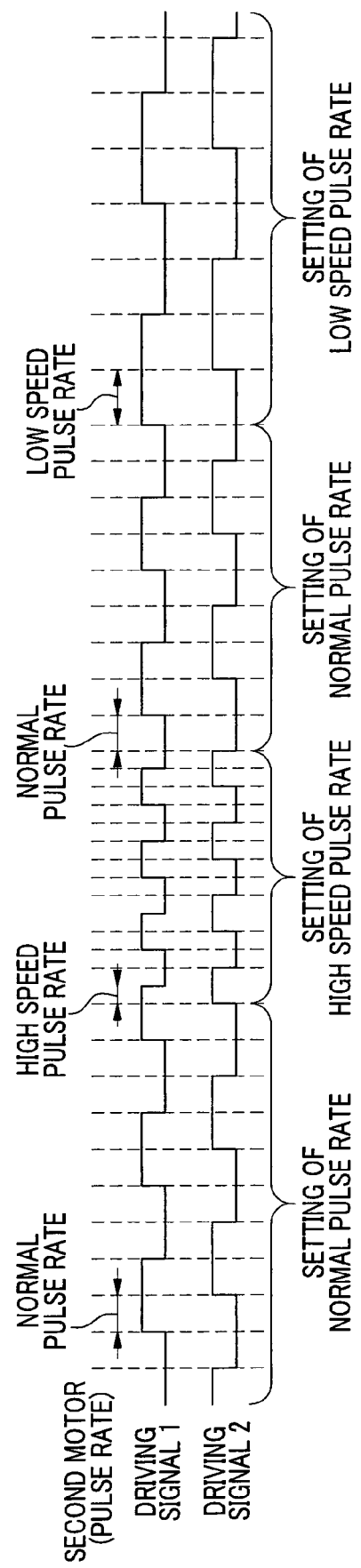
FIG. 10 is a timing chart showing a control of a second motor to drive the third lens group in high and low driving pulse rates

Here, a method for varying the driving speed of the third lens group 1B by the driving pulse rate to the second motor 1B is explained with reference to FIG. 10.

The second motor 4B is driven at the normal driving pulse rate of 800 pps and is configured to confirm the position of the third lens group 1B with a unit of Zp (zoom position). If the position of the third lens group 1B is P2 or less and the group-between distance enlarges, the driving pulse rate to the second motor 4B is increased to 1000 pps to accelerate the driving speed.

Thereafter, if the third lens group 1B is positioned in the group-between-holding section, the driving pulse rate of the second motor 4B is returned to the normal pulse rate of 800 pps. In addition, if the position of the third lens group 1B is P1 or more and close to the first and second lens group unit 1A, the driving pulse rate to the second motor 4B is decreased to 500 pps to deaccelerate the driving speed.

As mentioned above, if the position of the third lens group 1B is out of the group-between-holding section, the first and second lens group unit 1A and the third lens group 1B can be driven simultaneously while avoiding the interference and the excessive separation of the first and second lens group unit 1A and the third lens group 1B by controlling the speed of the third lens group 1B.

In step S112, the position of the third lens group 1B relative to the first and second lens group unit 1A is checked and it is determined whether the change of the driving speed of the first and second lens group unit is required in order to avoid the interference and the excessive separation of the first and second lens group unit 1A and the third lens group 1B.

In addition, to prevent the first and second lens group unit 1A and the third lens group 1B from being excessively separated, if it is determined that it is necessary to lower the driving speed of the first and second lens group unit 1A, a temperature is determined and if it is a low temperature (0° C. or less), the driving speed adjustment for the first and second lens group unit 1A is prohibited. Therefore, it is determined that the change is not required. This is to prioritize preventing the first and second lens group unit 1A from drive failure.

Here, as shown in FIG. 9, if the position of the third lens group 1B to the first and second lens group unit 1A exceeds a second predetermined position L1 which is close to the first and second lens group unit than the first predetermined position P1 and approaches the first and second lens group unit 1A (a dotted line portion A2 in FIG. 9), or exceeds a fourth predetermined position L2 which is remote from the first and second lens group unit 1A than a third predetermined position and is remote from the first and second lens group unit 1A (a solid line portion B in FIG. 9), the change of the driving speed of the first and second lens group unit A is required, the flow proceeds to step S113.

On the other hand, if the position of the third lens group 1B to the first and second lens group unit 1A exists between the second and fourth predetermined positions L1 and L2, the change of the driving speed of the third lens group 1B is not required, the flow is returned to step S 106. Hereinafter, an interval between the second and fourth predetermined positions L1 and L2 is referred to as a group-between-holding limiting section.

In step S 113, if the position of the third lens group 1B to the first and second lens group unit 1A exceeds the second predetermined position L1 and approaches the first and second lens group unit 1A (the dotted line portion A2 in FIG. 9), because there is possibility that the interference of the first and second lens group unit 1A and the third lens group 1B occurs, the speed of the first and second lens group unit 1A is accelerated by a predetermined to avoid the interference.

Also, if the position of the third lens group 1B to the first and second lens group unit 1A exceeds the fourth predetermined position L2 and is remote from the first and second lens group unit 1A (the dotted line portion B2 in FIG. 9), because there is possibility that the first and second lens group unit 1A and the third lens group 1B are excessively separated, the speed of the first and second lens group unit 1A is increased by a predetermined amount to avoid the excess separation of the first and second lens group unit and the third lens group.

An appropriate amount of each of acceleration and slowdown of the photographing lens system 1 is computed by the CPU 5 based on the driving speed of the first and second lens group unit 1A, a position of the first and second lens group unit 1A detected by the lens displacement-detecting device 7, and a position of the third lens group 1B computed by the input pulse of the second motor 4B.

As shown in FIGS. 2 and 9, the zoom position Zp3 (N) of the third lens group 1B configured to form a predetermined magnification ratio relative to a zoom position Zp12 (N) of the first and second lens group unit 1A is previously set.

Here, the position L1 of the third lens group 1B which initiates the slowdown of the first and second lens group unit 1A is set to be a position close to the next zoom position Zp3 (N+1) of the third lens group 1B from the zoom position Zp3 (N) of the third lens group 1B by ½ between the zoom position Zp3 (N) of the third lens group 1B and the next zoom position Zp3 (N+1) of the third lens group 1B.

That is to say, the following equation is satisfied.

$$L1 = Zp3(N) + (Zp3(N+1) - Zp3(N))\tfrac{1}{2}$$

On the other hand, the position L2 of the third lens group 1B which initiates the acceleration of the first and second lens group unit 1A is set to be a position close to a zoom position Zp3 (N−2) which is the two step short of the zoom position Zp3 (N) of the third lens group 1B from the zoom position Zp3 (N−1) which is the one step short of the zoom position of the third lens group 1B, by ⅓ between the zoom position Zp3 (N−1) and the zoom position Zp3 (N−2).

That is to say, the following equation is satisfied.

$$L2 = Zp3(N-1) - (Zp3(N-1) - Zp3(N-2))/3$$

When representing the positions L1 and L2 by the output pulse to the second motor 4B as shown in FIG. 2, if the zoom position of the third lens group 1B is Zp3 (4) (N=4), the following equation is satisfied.

$$L1 = 360 + (380 - 360)/2 = 370$$

$$L2 = 340 - (340 - 320)/3 = 334$$

In other words, in a case where the zoom position of the first and second lens group unit 1A is Zp (4) (N=4), if the output pulse to the second motor 4B is 370 or more, the driving speed of the third lens group 1B is accelerated, on the contrary, if the output pulse to the second motor 4B is 334 or less, the driving speed of the first and second lens group unit 1A is deaccelerated.

Here, a method for varying the driving speed of the first and second lens group unit 1A by the driving voltage of the first and second lens group unit 1A is explained with reference to FIG. 11.

Figure 11:
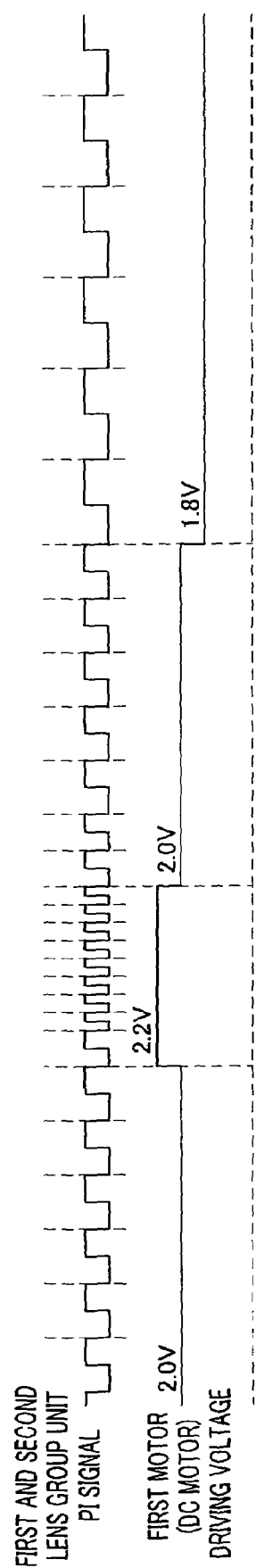
FIG. 11 is a timing chart showing a control of a first motor to drive the first and second lens group unit in applied high and low driving voltages in the first embodiment.

The first motor 4A is driven at the normal driving voltage of 2.0V, as shown in FIG. 11 and is configured to confirm the position of the third lens group 1B with a unit of Zp (zoom position). If the position of the third lens group 1B is L1 or less, and if the group-between distance between the first and second lens group unit and the third lens group is decided, the driving voltage to the first motor 4A is increased to 2.2V to accelerate the driving speed.

Thereafter, if the third lens group 1B arrives at the normal position, the driving voltage of the first motor 4A is returned to the normal voltage of 2.0V. In addition, if the position of the third lens group is L2 or less and the group-between distance is increased, the driving voltage of the first and second lens group unit 4A is reduced to 1.8V to deaccelerate the driving speed.

As mentioned above, if the position of the third lens group 1B is out of the group-between-holding limiting section, the first and second lens group unit 1A and the third lens group 1B can be driven simultaneously while avoiding the interference and the excessive separation of the first and second lens group unit 1A and the third lens group 1B by controlling the speed of the first and second lens group unit 1A.

In step S106, after it is determined that the stop of the first and second lens group unit 1A is required, the flow proceeds to step S114.

In step S 114, the driving state of the third lens group 1B is determined. Here, if the third lens group 1B stops, the flow proceeds to step S116. On the other hand, if the third lens group 1B is driving, the flow proceeds to step S 115 to stop the driving of the third lens group 1B, thereafter, the flow proceeds to step S116.

In step S116, control to stop the first and second lens group unit 1A is made. The first and second lens group unit 1A is driven by the first motor 4A which is the DC motor, the first motor 4A is not instantly stopped to generate overrun, even if the application of the driving voltage is stopped.

To reduce an amount of the overrun, the stopping control lowering the driving voltage of the first motor 4A is performed at the time that the stopping operation of the first and second lens group unit 1A is initiated (see the timing chart of the first motor 4A in each of FIGS. 5 and 6). After the stopping control, the flow proceeds to step S117.

In step S117, when the pulses in which the lens displacement-detecting device 7 outputs arrive at predetermined numbers from the time that the stopping control of the first and second lens group unit 1A is initiated, brake control (general electromagnetic brake) of the first motor 4A is performed to stop the first and second lens group unit (see the timing chart of the first motor 4A in each of FIGS. 5 and 6).

Meanwhile, the overrun during the braking control is also included in a stopping position of the first and second lens group unit 1A. Thereafter, the flow proceeds to step S118.

In step S118, a driving direction of the photographing lens system 1 is determined in order to perform backrush control (mentioned hereinafter) preventing the lens groups from positional deviation due to backrush of gears (not shown) provided in the above-mentioned transmission mechanism. If the driving direction of the photographing lens system 1 is telephoto from wide-angle (W→T in FIGS. 3 and 4), it is determined that the backrush control is not required and the flow proceeds to step S120.

If the driving direction of the photographing lens system 1 is wide-angle from telephoto (T→W in FIGS. 3 and 4), it is determined that the backrush control is required and the flow proceeds to step S119 to execute the backrush control.

In step S120, positional correction-driving, control for the third lens group 1B is performed (see the timing chart of the third lens group 4B in each of FIGS. 5 and 6). This control is to drive the third lens group to an appropriate stopping position of the third lens group 1B which is computed by the CPU 5B and corresponds to a final position of the first and second lens group unit 1A. The stopping position is computed based on positional information of the first and second lens group unit 1A and the third lens group 1B, as shown in FIG. 2. Thereafter, the flow proceeds to step S121.

In step S121, aperture driving control to set aperture values by the first and second aperture stops 2A and 2B in aperture values corresponding to positions of the stopped lens groups is executed (see the timing charts for the fourth and fifth motors 4D and 4E in FIGS. 5 and 6). Thereafter, the flow proceeds to step S122 and the driving control for the photographing lens system 1 is completed.

(Driving Control from Telephoto to Wide Angle)

Next, a case where the driving direction of the photographing lens system 1 is driven from telephoto to wide-angle is explained.

FIGS. 3 and 4 illustrate zoom operation when the driving control is executed.

If the photographing lens system 1 is driven from the telephoto to the wide-angle (T→W in FIGS. 3 and 4) by the wide-angle switch 6B to drive from the telephoto to the wide-angle being pressed by a user, the flow proceeds from step S101 to step S102.

Figure 7:
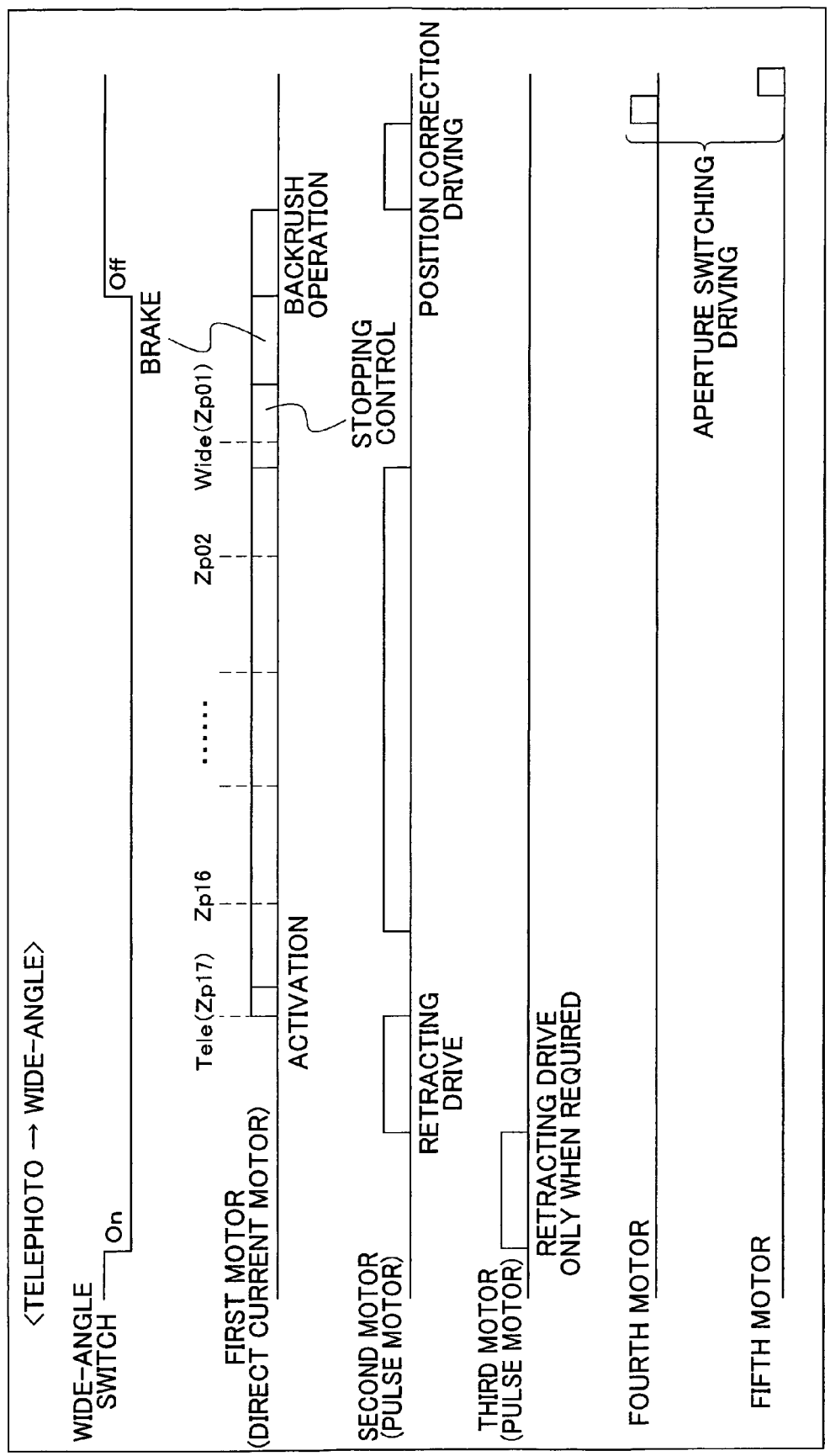
FIG. 7 is a timing cart showing a case where the photographing lens system is zoomed-out from the telephoto to the wide-angle.
Figure 8:
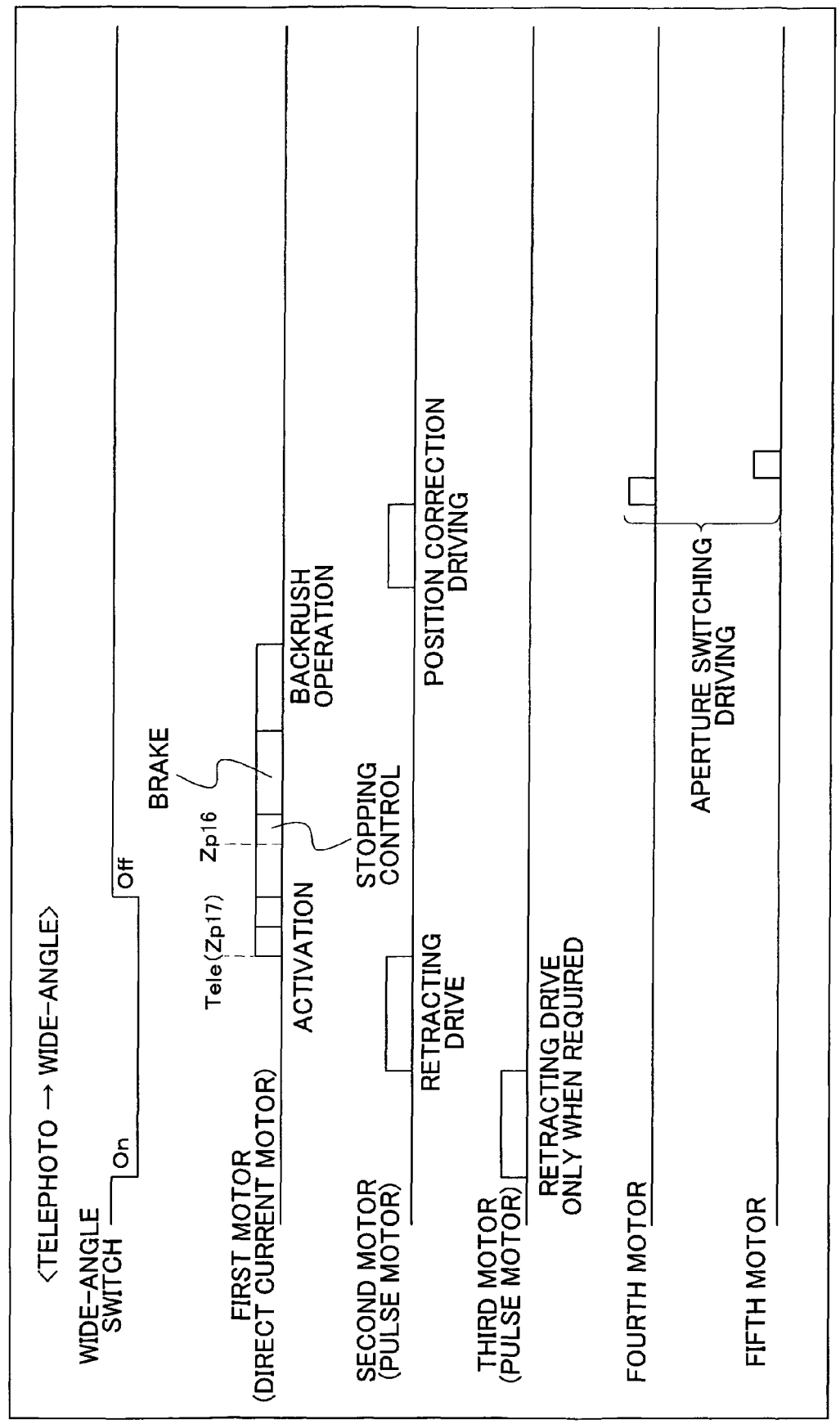
FIG. 8 is a timing cart showing a case where operation of a wide-angle switch is temporarily interrupted when the photographing lens system is zoomed-out from the telephoto to the wide-angle.

In step S102, a retraction driving control to move away the fourth lens group 1C from the third lens group 1B is executed (see the timing chart of the third motor 4C in each of FIGS. 7 and 8). If the photographing lens system 1 is driven from the telephoto to the wide-angle, the lens groups 1A, 1B and 1C are in an approaching state and there is possibility that the third and fourth lens groups 1B and 1C interfere.

Therefore, if the position of the fourth lens group 1C is in a position which approaches the third lens group 1B than a predetermined position at which the fourth lens group 1C does not interfere with the third lens group 1B, the retraction driving control of the fourth lens group 1C in which the fourth lens group 1C is moved away from the third lens group 1B to the predetermined position where the fourth lens group 1C does not interfere with the third lens group 1B when the third lens group 1B is driven is executed. Thereafter, the flow proceeds to step S 103.

In step S103, to determine the necessity of the retraction driving control of the third lens group 1B, it is determined whether the driving direction of the photographing lens system 1 is in a state from the telephoto to the wide-angle or from the wide-angle to the telephoto.

If the photographing lens system 1 is driven from the telephoto to the wide-angle (T→W in FIGS. 3 and 4) by the wide-angle switch 6B to drive from the telephoto to the wide-angle being pressed by a user, the flow proceeds to step S104.

In step S104, a retraction driving control to move away the third lens group 1B from the first and second lens group unit 1A is executed (see the timing chart of the second motor 4B in each of FIGS. 7 and 8). If the photographing lens system 1 is driven from the telephoto to the wide-angle, the lens groups 1A, 1B and 1C are in an approaching state and there is possibility that the first and second lens group unit 1A and the third lens group 1B interfere.

Therefore, a retraction driving control of the third lens group 1B in which the third lens group 1B is previously moved away from the first and second lens group unit 1A by a predetermined distance before the first and second lens group unit 1A is driven is executed. For example, the predetermined distance is a half distance between the zoom position Zp3 (N) where the third lens group 1B is positioned and the zoom position Zp3 (N−1) which is the one step short of the zoom position Zp3 (N). Thereafter, the flow proceeds to step S 105.

In step S105, by the wide-angle switch 6B being pressed, the drive of the first and second lens group unit 1A is initiated by the first motor 4A. Here, because the first motor is the DC motor, the incoming current to reduce a voltage of the power source right after the initiation of driving occurs and affects a life of the battery. To avoid this, the driving voltage of the first and second lens group unit 1A is set to be a value lower than a steady driving voltage, and an actuation control in which the set voltage is increased to the steady voltage after a predetermined time lapses is executed (see the timing chart of the first motor 4A in each of FIGS. 7 and 8).

In step S105, the flow proceeds to step S106 after the drive of the first and second lens group unit 1A is initiated.

In step S106, it is determined whether it is necessary to stop the first and second lens group unit 1A. Here, if it is necessary to stop the first and second lens group unit 1A, in other words, if the wide-angle switch 6B is not pressed (time point that the wide-angle switch 6B becomes OFF as shown in FIG. 8), or if the first and second lens group unit 1A is driven to a position before a predetermined distance relative to the maximum wide-angle side (in FIG. 7, a time point that the stopping control of the first and second lens group unit 1A is initiated), the flow proceeds to step S114.

On the other hand, if it is not necessary to stop the first and second lens group unit 1A, the flow proceeds to step S107.

In step S107, it is determined whether the third lens group 1B is stopping or driving. Here, if the third lens group 1B is stopping, the flow proceeds to step S 108. On the other hand, if the third lens group 1B is driving, the flow proceeds to step S 110.

In step S108, it is determined whether a predetermined time lapses to have a time difference between a drive initiating timing of the first and second lens group unit 1A and a drive initiating timing of the third lens group 1B, after the drive of the first and second lens group unit 1A is initiated.

By having a time difference between the drive initiating timing of the first and second lens group unit 1A and the drive initiating timing of the third lens group 1B, it is not necessary to drive the first and second motors 4A and 4B simultaneously and it is not necessary that the power source supplies a great deal of current consumption in a short time. As a result, it is possible to prolong a life of the battery.

The determination of the passage of the predetermined time is performed by counting the number of output pulse output from the lens displacement0detecting device 7 until reaching a predetermined number.

In step S108, if the predetermined time is lapsed after the drive of the first and second lens group unit 1A is initiated, the flow proceeds to step S109. On the other hand, if the predetermined time is not lapsed after the drive of the first and second lens group unit 1A is initiated, the flow is returned to step S106, and the above-mentioned steps are repeated.

In step S109, the drive of the third lens group 1B is initiated by the second motor 4B. At this time, the driving speed of the third lens group 1B is a predetermined speed, for example, an input pulse rate of the second motor 4B is set to be 600 pps. Thereafter, the flow is returned to step S106.

In step S107, if the third lens group 1B is driving, the flow proceeds to step S110. In step S 110, the position of the third lens group to the first and second lens group unit 1A is checked, it is determined whether the change of the driving speed of the first and second lens group unit 1A is required in order to avoid interference and excessive separation of the first and second lens group unit 1A and the third lens group 1B.

As mentioned above, the determination of temperature is made, if the determination of a low temperature (0° C. or less) is made, the driving speed-limit value of the third lens group 1B is used for a low temperature. In the embodiment, the driving speed is adjusted by the driving pulse rate, and the driving speed-limit value of the third lens group 1B corresponds to the maximum driving pulse rate value. As mentioned above, the maximum driving pulse rate at the normal temperature is 1200 pps and the maximum driving pulse rate at the lower temperature is 1000 pps.

Here, as shown in FIG. 9, if the position of the third lens group 1B to the first and second lens group unit 1A exceeds the first predetermined position P1 and approaches the first and second lens group unit 1A (the dotted line portion A1 in FIG. 9), or exceeds the third predetermined position P2 and is remote from the first and second lens group unit 1A (the dotted line portion B1 in FIG. 9), the flow proceeds to step S 111. On the other hand, if the position of the third lens group 1B to the first and second lens group unit 1A exists between P1 and P2, that is to say, in the group-between holding section, the flow is returned to step S106.

In step S 111, if the position of the third lens group 1B to the first and second lens group unit 1A exceeds the first predetermined position P1 and approaches the first and second lens group unit 1A (the dotted line portion A1 in FIG. 9), because there is possibility that the interference of the first and second lens group unit 1A and the third lens group 1B occurs, the driving speed of the third lens group 1B accelerates by a predetermined amount to avoid the interference.

Also, if the position of the third lens group 1B to the first and second lens group unit 1A exceeds the third predetermined position P2 and is remote from the first and second lens group unit 1A (the dotted line portion B1 in FIG. 9), because there is possibility that the first and second lens group unit 1A and the third lens group 1B is excessively separated, the driving speed of the third lens group 1B is deaccelerated by a predetermined amount to avoid the excess separation of the first and second lens group unit 1A and the third lens group 1B.

An appropriate amount of each of acceleration and slowdown of the photographing lens system 1 is computed by the CPU 5 based on the driving speed of the first and second lens group unit 1A, a position of the first and second lens group unit 1A detected by the lens displacement-detecting device 7, and a position of the third lens group 1B computed by the input pulse of the second motor 4B.

As shown in FIGS. 2 and 9, the zoom position Zp3 (N) of the third lens group 1B configured to form a predetermined magnification ratio relative to the zoom position Zp12 (N) of the first and second lens group unit 1A is previously set.

Here, the position P1 of the third lens group 1B which initiates the acceleration of the third lens group 1B is set to be a position close to the next zoom position Zp3 (N+1) of the third lens group 1B from the zoom position Zp3 (N) of the third lens group 1B by ⅓ between the zoom position Zp3 (N) of the third lens group 1B and the next zoom position Zp3 (N+1) of the third lens group 1B.

That is to say, the following equation is satisfied.

$$P1 = Zp3(N) + (Zp3(N+1) - Zp3(N))/3$$

On the other hand, the position P2 of the third lens group 1B which initiates the slowdown of the third lens group 1B is set to be a position close to a zoom position Zp3 (N−1) which is the one step short of the zoom position Zp3 (N) of the third lens group 1B.

That is to say, the following equation is satisfied.

$$P2 = Zp3(N-1)$$

When representing the positions P1 and P2 by the output pulse to the second motor 4B as shown in FIG. 2, if the zoom position of the third lens group 1B is Zp3 (4) (N=4), the following equation is satisfied.

$$P1 = 360 + (380 - 360)/3 = 366$$

$$P2 = 340$$

In other words, in a case where the zoom position of the first and second lens group unit 1A is Zp (4) (N=4), if the output pulse to the second motor 4B is 366 or more, the driving speed of the third lens group 1B is accelerated, on the contrary, if the output pulse to the second motor 4B is 340 or less, the driving speed of the third lens group 1B is deaccelerated.

Here, a method for varying the driving speed of the third lens group 1B by the driving pulse rate to the second motor 4B is explained with reference to FIG. 10.

The second motor 4B is driven at the normal driving pulse rate of 800 pps and is configured to confirm the position of the third lens group 1B with a unit of Zp (zoom position). If the position of the third lens group 1B is P1 or more and the group-between distance is reduced, the driving pulse rate of the second motor 4B is increased to 1200 pps to accelerate the driving speed (1000 pps at the low temperature).

Thereafter, if the third lens group 1B is positioned in the group-between-holding section, the driving pulse rate of the second motor 4B is returned to the normal pulse rate of 800 pps. In addition, if the position of the third lens group 1B is P2 or less and the group-between distance enlarges, the driving pulse rate to the second motor 4B is decreased to 500 pps to deaccelerate the driving speed.

As mentioned above, if the position of the third lens group 1B is out of the group-between-holding section, the first and second lens group unit 1A and the third lens group 1B can be driven simultaneously while avoiding the interference of the first and second lens group unit 1A and the third lens group 1B by controlling the speed of the third lens group 1B.

In step S112, the position of the third lens group 1B relative to the first and second lens group unit 1A is checked and it is determined whether the change of the driving speed of the first and second lens group unit is required in order to avoid the interference and the excessive separation of the first and second lens group unit 1A and the third lens group 1B.

In addition, to prevent the first and second lens group unit 1A and the third lens group 1B from being excessively approached, if it is determined that it is necessary to lower the driving speed of the first and second lens group unit 1A, a temperature is determined and if it is a low temperature (0° C. or less), the driving speed limiting value of the first and second lens group unit 1A is used for the low temperature. In the embodiment, the driving speed is adjusted by the driving voltage, the driving speed limiting value of the first and second lens group unit 1A is the minimum driving voltage value.

The minimum driving voltage at the normal temperature is 1.8V and the minimum driving voltage at the low temperature is 1.9V.

Here, as shown in FIG. 9, if the position of the third lens group 1B to the first and second lens group unit 1A exceeds the second predetermined position L1 which is close to the first and second lens group unit 1A than the first predetermined position P1 and approaches the first and second lens group unit 1A (the dotted line portion A2 in FIG. 9), or exceeds the fourth predetermined position L2 which is remote from the first and second lens group unit 1A than the third predetermined position and is remote from the first and second lens group unit 1A (the solid line portion B in FIG. 9), the flow proceeds to step S113.

On the other hand, if the position of the third lens group 1B to the first and second lens group unit 1A exists between the second and fourth predetermined positions L1 and L2, that is to say, in the group-between holding limiting section, the flow is returned to step S 106.

In step S 113, if the position of the third lens group 1B to the first and second lens group unit 1A exceeds the second predetermined position L1 and approaches the first and second lens group unit 1A (the dotted line portion A2 in FIG. 9), because there is possibility that the interference of the first and second lens group unit 1A and the third lens group 1B occurs, the speed of the first and second lens group unit 1A is accelerated by a predetermined amount to avoid the interference.

Also, if the position of the third lens group 1B to the first and second lens group unit 1A exceeds the fourth predetermined position L2 and is remote from the first and second lens group unit 1A (the dotted line portion B2 in FIG. 9), because there is possibility that the first and second lens group unit 1A and the third lens group 1B are excessively separated, the speed of the first and second lens group unit 1A is accelerated by a predetermined amount to avoid the excess separation of the first and second lens group unit and the third lens group.

An appropriate amount of each of acceleration and slowdown of the photographing lens system 1 is computed by the CPU 5 based on the driving speed of the first and second lens group unit 1A, a position of the first and second lens group unit 1A detected by the lens displacement-detecting device 7, and a position of the third lens group 1B computed by the input pulse of the second motor 4B.

As shown in FIGS. 2 and 9, the zoom position Zp3 (N) of the third lens group 1B configured to form a predetermined magnification ratio relative to a zoom position Zp12 (N) of the first and second lens group unit 1A is previously set.

Here, the position L1 of the third lens group 1B which initiates the slowdown of the first and second lens group unit 1A is set to be a position close to the next zoom position Zp3 (N+1) of the third lens group 1B from the zoom position Zp3 (N) of the third lens group 1B by ½ between the zoom position Zp3 (N) of the third lens group 1B and the next zoom position Zp3 (N+1) of the third lens group 1B.

That is to say, the following equation is satisfied.

$$L1=Zp3(N)+(Zp3(N+1)-Zp3(N))/2$$

On the other hand, the position L2 of the third lens group 1B which initiates the acceleration of the first and second lens group unit 1A is set to be a position close to a zoom position Zp3 (N−2) which is the two step short of the zoom position Zp3 (N) of the third lens group 1B from the zoom position Zp3 (N−1) which is the one step short of the zoom position of the third lens group 1B, by ⅓ between the zoom position Zp3 (N−1) and the zoom position Zp3 (N−2).

That is to say, the following equation is satisfied.

$$L2=Zp3(N-1)$$

When representing the positions L1 and L2 by the output pulse to the second motor 4B as shown in FIG. 2, if the zoom position of the third lens group 1B is Zp3 (4) (N=4), the following equation is satisfied.

$$L1=360+(380-360)/2=370$$

$$L2=340-(340-320)/3=334$$

In other words, in a case where the zoom position of the first and second lens group unit 1A is Zp (4) (N=4), if the output pulse to the second motor 4B is 370 or more, the driving speed of the first and second lens group unit 1A is deaccelerated, on the contrary, if the output pulse to the second motor 4B is 334 or less, the driving speed of the first and second lens group unit 1A is accelerated.

Here, a method for varying the driving speed of the first and second lens group unit 1A by the driving voltage of the first and second lens group unit 1A is explained with reference to FIG. 11.

The first motor 4A is driven at the normal driving voltage of 2.0V, as shown in FIG. 11 and is configured to confirm the position of the third lens group 1B with a unit of Zp (zoom position). If the position of the third lens group 1B is L2 or less, and if the group-between distance between the first and second lens group unit and the third lens group enlarges, the driving voltage to the first motor 4A is increased to 2.2V to accelerate the driving speed.

Thereafter, if the third lens group 1B arrives at the normal position, the driving voltage of the first motor 4A is returned to the normal voltage of 2.0V. In addition, if the position of the third lens group 1B is L1 or more and the group-between distance is reduced, the driving voltage of the first and second lens group unit 4A is reduced to 1.8V to deaccelerate the driving speed (1.9V at the low temperature).

As mentioned above, if the position of the third lens group 1B is out of the group-between-holding limiting section, the first and second lens group unit 1A and the third lens group 1B can be driven simultaneously while avoiding the interference of the first and second lens group unit 1A and the third lens group 1B by controlling the speed of the third lens group unit 1B.

In step S106, after it is determined that the stop of the first and second lens group unit 1A is required, the flow proceeds to step S114.

In step S 114, the driving state of the third lens group 1B is determined. Here, if the third lens group 1B stops, the flow proceeds, to step S116. On the other hand, if the third lens group 1B is driving, the flow proceeds to step S 115 to stop the driving of the third lens group 1B, thereafter, the flow proceeds to step S116.

In step S116, a control to stop the first and second lens group unit 1A is made. The first and second lens group unit 1A is driven by the first motor 4A which is the DC motor, the first motor 4A is not instantly stopped to generate overrun, even if the application of the driving voltage is stopped.

To reduce an amount of the overrun, the stopping control lowering the driving voltage of the first motor 4A is performed at the time that the stopping operation of the first and second lens group unit 1A is initiated (see the timing chart of the first motor 4A in each of FIGS. 7 and 8). After the stopping control, the flow proceeds to step S117.

In step S117, when the pulses in which the lens displacement-detecting device 7 outputs arrive at predetermined numbers from the time that the stopping control of the first and second lens group unit 1A is initiated, brake control (general electromagnetic brake) of the first motor 4A is performed to stop the first and second lens group unit (see the timing chart of the first motor 4A in each of FIGS. 7 and 8).

Meanwhile, the overrun during the braking control is also included in a stopping position of the first and second lens group unit 1A. Thereafter, the flow proceeds to step S118.

In step S118, a driving direction of the photographing lens system 1 is determined in order to perform backrush control (mentioned hereinafter) preventing the lens groups from positional deviation due to backrush of gears (not shown) provided in the above-mentioned transmission mechanism. If the driving direction of the photographing lens system 1 is a state from the telephoto to the wide angle (T→W in FIGS. 3 and 4), in embodiment, the flow proceeds to step S119 to perform the backrush control.

In step S 119, the backrush control of the first and second lens group unit 1A is performed (see the timing chart of the first motor 4A in each of FIGS. 7 and 8).

The backrush control is, after the first and second lens group unit 1A is driven until it exceeds a predetermined stopping position, performed by driving the first and second lens group unit 1A again in the opposite direction, in other words, the direction from the wide angle to the telephoto to return the first and second lens group unit 1A to a predetermined position. Gears of a usual driving mechanism have a backrush and the correct position is not decided. The backrush is avoided by setting the driving direction of driving portions to be in one direction constantly. After the backrush control is executed, the flow proceeds to step S120.

In step S120, the positional correction-driving control for the third lens group 1B is executed (see the timing chart of the third lens group 4B in each of FIGS. 7 and 8). This control is to drive the third lens group to an appropriate stopping position of the third lens group 1B which is computed by the CPU 5B and corresponds to a final position of the first and second lens group unit 1A. The stopping position is computed based on positional information of the first and second lens group unit 1A and the third lens group 1B, as shown in FIG. 2. Thereafter, the flow proceeds to step S121.

In step S121, aperture driving control to set aperture values by the first and second aperture stops 2A and 2B in aperture values corresponding to positions of the stopped lens groups is executed (see the timing charts for the fourth and fifth motors 4D and 4E in FIGS. 7 and 8). Thereafter, the flow proceeds to step S122 and the driving control for the photographing lens system 1 is completed.

Meanwhile, the above-mentioned group-between holding section and group-between holding limiting section may be different ranges in cases from the wide-angle to the telephoto and from the telephoto to the wide-angle and changed every zoom position.

Moreover, in the above-mentioned embodiment, although the backrush control has been executed in a case of driving from the telephoto to the wide-angle, the backrush control may be executed in a case of driving from the wide-angle to the telephoto.

As mentioned above, the lens driving-control device 100 according to the first embodiment of the present invention includes the first and second lens group unit 1A and the third lens group 1B having the variable magnification function, the first motor 4A and the second motor 4B to drive the first and second lens group unit 1A and the third lens group 1B so that the driving speeds thereof are capable of adjusting, respectively, the CPU 5B to control the first motor 4A and the second motor 4B to adjust the driving speeds, and the first lens position-detecting device 9A and the second lens position-detecting device 9B to detect positions of the first and second lens group unit 1A and the third lens group 1B, respectively. When the first and second lens group unit 1A and the third lens group 1B are simultaneously driven by the first motor 4A and the second motor 4B, the CPU 5B controls the first motor 4A and the second motor 4B to switch the lens groups in which the driving speed is to be adjusted to the first and second lens group unit 1A and the third lens group 1B based on the positional relationship between first and second lens group unit 1A and the third lens group 1B, which is detected by the first lens position-detecting device 9A and the second lens position-detecting device 9B.

Thereby, because the first and second lens group unit 1A and the third lens group 1B are simultaneously driven in parallel by driving the first motor 4A and the second motor 4B by the CPU 5B simultaneously and in parallel, it is possible to prevent a required time from the driving initiation to the driving completion of the first and second lens group unit 1A and the third lens group 1B from lengthening, compared with a conventional lens driving-control device in which the first and second lens group unit 1A and the third lens group 1B are progressively driven.

The first and second lens group unit 1A and the third lens group 1B are prevented from interfering by controlling the first motor 4A and the second motor 4B by the CPU 5B to adjust the driving speeds of the first and second lens group unit 1A and the third lens group 1B so that the first and second lens group unit 1A and the third lens group 1B interfere.

The CPU 5B switches the lens groups in which the driving speed is to be adjusted to the first and second lens group unit 1A and the third lens group 1B based on the positional relationship between the first and second lens group unit 1A and the third lens group 1B, which is detected by the first lens position-detecting device 9A and the second lens position-detecting device 9B, thereby, it is possible to solve the excessive approaching and the excessive separation between the first and second lens group unit 1A and the third lens group 1B according to an approaching degree or separation degree of the first and second lens group unit 1A and the third lens group 1B.

In the lens driving-control device 100 in the first embodiment, the switching from the lens groups to the first and second lens group unit 1A and the third lens group 1B by the CPU 5B is to adjust the driving speed of the third lens group 1B so that the first and second lens group unit 1A and the third lens group 1B do not further approach when the third lens group 1B exceeds the first predetermined position P1 and approaches the first and second lens group unit 1A which is the objective lens, and adjust the driving speed of the first and second lens group unit 1A so that the first and second lens group unit 1A and the third lens group 1B do not further approach when the third lens group 1B exceeds the second predetermined position close to the first and second lens group unit 1A than the first predetermined position P1 and approaches the first and second lens group unit 1A.

Thereby, if the third lens group 1B to the first and second lens group unit 1A exceeds the first predetermined position P1 and approaches the first and second lens group unit 1A (first approaching step), the first and second lens group unit 1A and the third lens group 1B are prevented from further approaching by adjusting the driving speed of the third lens group 1B, whereas if the third lens group 1B to the first and second lens group unit 1A exceeds the second predetermined position P2 close to the first and second lens group unit 1A than the first predetermined position P1 and approaches the first and second lens group unit 1A (second approaching step), the adjustment of the driving speed is switched to the first and second lens group unit 1A. In this way, the driving speeds of the first and second lens group unit 1A and the third lens group 1B are adjusted by adjusting the driving speed of the first and second lens group unit 1A. In this case, in the first approaching step the driving speed of the third lens group 1B is adjusted, and in the second approaching step the driving speed of the third lens group 1B is held in a speed after adjusted and the driving speed of the first and second lens group unit 1A is adjusted.

Thereby, it is possible to enhance a degree reducing the approaching as a degree of approaching increases.

In the lens driving-control device 100 in the first embodiment, the switching from the lens groups to the first and second lens group unit 1A and the third lens group 1B by the CPU 5B is to adjust the driving speed of the third lens group 1B so that the first and second lens group unit 1A and the third lens group 1B do not further separate when the third lens group 1B exceeds the third predetermined position P2 and separates from the first and second lens group unit 1A, and adjust the driving speed of the first and second lens group unit 1A so that the first and second lens group unit 1A and the third lens group 1B do not further separate when the third lens group 1B exceeds the fourth predetermined position L2 remote from the first and second lens group unit 1A than the third predetermined position P2 and separates from the first and second lens group unit 1A.

Thereby, if the third lens group 1B to the first and second lens group unit 1A exceeds the third predetermined position P2 and separates from the first and second lens group unit 1A (first separation step), the first and second lens group unit 1A and the third lens group 1B are prevented from further separating by adjusting the driving speed of the third lens group 1B, whereas if the third lens group 1B to the first and second lens group unit 1A exceeds the fourth predetermined position L2 close to the first and second lens group unit 1A than the third predetermined position P2 and separates from the first and second lens group unit 1A (second separation step), the adjustment of the driving speed is switched to the first and second lens group unit 1A. In this way, the driving speeds of the first and second lens group unit 1A and the third lens group 1B are adjusted by adjusting the driving speed of the first and second lens group unit 1A. In this case, in the first separation step the driving speed of the third lens group 1B is adjusted, and in the second separation step the driving speed of the third lens group 1B is held in a speed after adjusted and the driving speed of the first and second lens group unit 1A is adjusted. Thereby, it is possible to enhance a degree reducing the separation as a degree of separation increases.

In the lens driving-control device 100 according to the first embodiment of the present invention, because the driving speed of the second motor 4B varies depending on an input pulse rate, the driving speed of the third lens group 1B can be adjusted by a simple operation of varying the driving pulse rate input in the second motor 4B only.

In the lens driving-control device 100 according to the first embodiment of the present invention, because the driving speed of the first motor 4A varies depending on an applied driving voltage, the driving speed of the first and second lens group unit 1A can be adjusted by a simple operation of varying the driving voltage applied to the first 4A only.

Meanwhile, the direct-current motor as the first motor 4A to vary the driving speed depending on the applied driving voltage can obtain a speed higher than a pulse motor, if they have the same supplying power, and has a characteristic in which the driving current varies depending on the variation in a load. Therefore, it is possible to withstand the variation of load and obtain smooth operation, because the driving current is increased by the increment of load, resulting in an increment of a driving torque of the motor.

Consequently, such a motor is adequate to drive, for example, a cam cylinder in which an inclination of a cam (load torque) varies depending on a zoom position.

In the lens driving-control device 100 according to the first embodiment of the present invention, because the first motor 4A to drive the first and second lens group unit 1A is the direct-current motor and the second motor 4B to drive the third lens group 4B is the pulse motor, the third lens group 1B can correctly be driven in response to the movement of the first and second lens group unit 1A.

[Second Embodiment]

Next, a lens driving-control device 100 according to a second embodiment of the present invention is explained.

(Driving Speed Control by Duty Driving Control)

The second embodiment shows a driving-control method in which the drive speed of the first and second lens group unit 1A is adjusted by increasing and decreasing a driving ratio (duty ratio) of the first and second lens group unit 1A depending on a position of the third lens group 1B to the first and second lens group unit 1A, and the first and second lens group unit 1A and the third lens group 1B are simultaneously driven so that the first and second lens group unit 1A and the third lens group 1B do not interfere.

The driving ratio in the second embodiment means a driving output proportion in a constant interval, 100% is all output, 50% is half output and half off, and 0% is all off.

Figure 12:
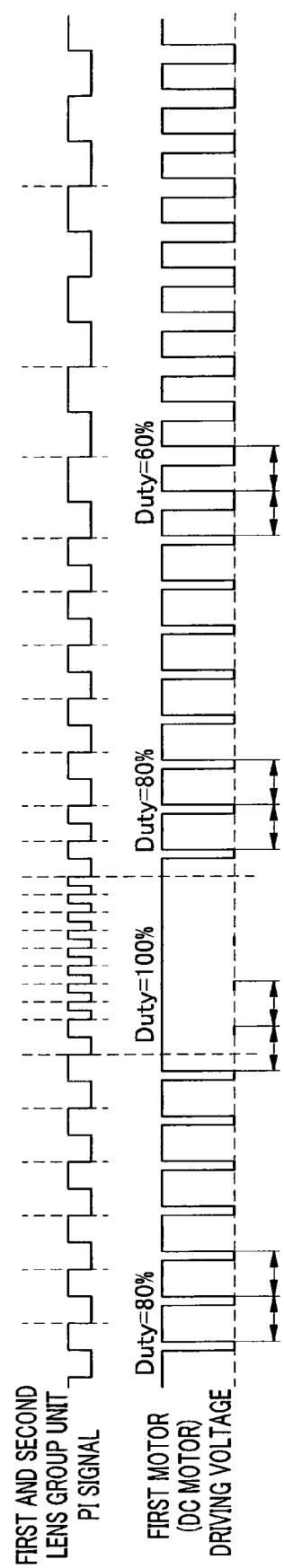
FIG. 12 is a timing chart showing another control of the first motor to drive the first and second lens group unit in a duty driving in the second embodiment.

Here, because a difference between the first embodiment and the second embodiment is only a content of step S113 of the flow chart as shown in FIG. 3, a content of step S113 in the second embodiment is explained with reference to FIG. 12 below.

(Control from the Wide-Angle to the Telephoto)

First, a description of a case where a driving direction of the photographing lens system 1 is from the wide-angle to the telephoto is made.

The first motor 4A is driven at the usual driving ration of 80% (interval of 10 [msec], 8 [msec] ON, 2 [msec] OFF), a position of the third lens group 1B is confirmed with Zp unit.

In step S 113, if the position of the third lens group 1B to the first and second lens group unit 1A exceeds the second predetermined position L1 and approaches the first and second lens group unit 1A (the dotted line portion A2 in FIG. 9), because there is possibility that the group-between distance is reduced and the interference of the first and second lens group unit 1A and the third lens group 1B occurs, the speed of the first and second lens group unit 1A is accelerated by a predetermined amount to avoid the interference.

That is to say, the driving ratio of the first and second lens group unit 1A increases to 100% (interval of 10 [msec], 10 [msec] ON, 0 [msec] OFF) to accelerate the driving speed. Thereafter, if the position of the third lens group 1B arrives at the normal position, the driving ratio of the first motor 4A is returned to the usual ratio of 80%.

Also, if the position of the third lens group 1B to the first and second lens group unit 1A exceeds the fourth predetermined position L2 and is remote from the first and second lens group unit 1A (the dotted line portion B2 in FIG. 9), because there is possibility that the group-between distance increases and the first and second lens group unit 1A and the third lens group 1B are excessively separated, the speed of the first and second lens group unit 1A is deaccelerated by a predetermined amount to avoid the excess separation of the first and second lens group unit 1A and the third lens group 1B.

That is to say, the driving ratio of the first and second lens group unit 1A is reduced to 60% (interval of 10 [msec], 10 [msec] ON, 0 [msec] OFF) to deaccelerate the driving speed.

In addition, to prevent the first and second lens group unit 1A and the third lens group 1B from being excessively separated, if it is determined that it is necessary to lower the driving speed of the first and second lens group unit 1A, a temperature is determined and if it is a low temperature (0° C. or less), the driving speed adjustment for the first and second lens group unit 1A is prohibited. Therefore, it is determined that the change is not required. This is to prioritize preventing the first and second lens group unit 1A from drive failure.

Meanwhile, a condition of positional relationship of L1 and L2 or other processing content is the same as that in the first embodiment, a further description is omitted.
(Control from the Telephoto to the Wide-Angle)

Next, a description of a case where a driving direction of the photographing lens system 1 is from the telephoto to the wide-angle is made.

The first motor 4A is driven at the usual driving ration of 80% (interval of 10 [msec], 8 [msec] ON, 2 [msec] OFF), a position of the third lens group 1B is confirmed with Zp unit.

In step S 113, if the position of the third lens group 1B to the first and second lens group unit 1A exceeds the second predetermined position L1 and approaches the first and second lens group unit 1A (the dotted line portion A2 in FIG. 9), because there is possibility that the group-between distance is reduced and the interference of the first and second lens group unit 1A and the third lens group 1B occurs, the speed of the first and second lens group unit 1A is deaccelerated by a predetermined amount to avoid the interference.

That is to say, the driving ratio of the first and second lens group unit 1A is reduced to 60% (interval of 10 [msec], 10 [msec] ON, 0 [msec] OFF) to deaccelerate the driving speed. Thereafter, if the third lens group 1B arrives at the normal position, the driving ratio of the first motor 4A is returned to the usual ratio of 80%.

Also, if the position of the third lens group 1B to the first and second lens group unit 1A exceeds the fourth predetermined position L2 and is remote from the first and second lens group unit 1A (the dotted line portion B2 in FIG. 9), because there is possibility that the group-between distance is increased and the first and second lens group unit 1A and the third lens group 1B are excessively separated, the speed of the first and second lens group unit MA is accelerated by a predetermined amount to avoid the excess separation of the first and second lens group unit and the third lens group.

That is to say, the driving ratio of the first and second lens group unit 1A is increased to 100% (interval of 10 [msec], 10 [msec] ON, 0 [msec] OFF) to accelerate the driving speed.

In addition, to prevent the first and second lens group unit 1A and the third lens group 1B from being excessively approached, if it is determined that it is necessary to lower the driving speed of the first and second lens group unit 1A, a temperature is determined and if it is a low temperature (0° C. or less), the driving speed limiting value of the first and second lens group unit 1A is used for the low temperature. That is to say, the driving ratio of the first and second lens group unit 1A is reduced to 70% (interval of 10 [msec], 7 [msec] ON, 3 [msec] OFF) to deaccelerate the driving speed.

Meanwhile, a condition of positional relationship of L1 and L2 or other processing content is the same as that in the first embodiment, a further description is omitted.

If the position of the third lens group 1B is out of the group-between-holding section, the first and second lens group unit 1A and the third lens group 1B can be driven simultaneously while avoiding the interference of the first and second lens group unit 1A and the third lens group 1B by controlling the speed of the first and second lens group unit 1A.

As mentioned above, the lens driving-control device 100 according to the second embodiment of the present invention includes the first and second lens group unit 1A and the third lens group 1B having the variable magnification function, the first motor 4A and the second motor 4B to drive the first and second lens group unit 1A and the third lens group 1B so that the driving speeds thereof are capable of adjusting, respectively, the CPU 5B to control the first motor 4A and the second motor 4B to adjust the driving speeds, and the first lens position-detecting device 9A and the second lens position-detecting device 9B to detect positions of the first and second lens group unit 1A and the third lens group 1B, respectively. When the first and second lens group unit 1A and the third lens group 1B are simultaneously driven by the first motor 4A and the second motor 4B, the CPU 5B controls the first motor 4A and the second motor 4B to switch the lens groups in which the driving speed is to be adjusted to the first and second lens group unit 1A and the third lens group 1B based on the positional relationship between first and second lens group unit 1A and the third lens group 1B, which is detected by the first lens position-detecting device 9A and the second lens position-detecting device 9B.

Thereby, because the first and second lens group unit 1A and the third lens group 1B are simultaneously driven in parallel by driving the first motor 4A and the second motor 4B by the CPU 5B simultaneously and in parallel, it is possible to prevent a required time from the driving initiation to the driving completion of the first and second lens group unit 1A and the third lens group 1B from lengthening, compared with a conventional lens driving-control device in which the first and second lens group unit 1A and the third lens group 1B are progressively driven.

The first and second lens group unit 1A and the third lens group 1B are prevented from interfering by controlling the first motor 4A and the second motor 4B by the CPU 5B to adjust the driving speeds of the first and second lens group unit 1A and the third lens group 1B so that the first and second lens group unit 1A and the third lens group 1B do not interfere.

The CPU 5B is configured to switch the lens groups in which the driving speed is to be adjusted to the first and second lens group unit 1A and the third lens group 1B based on the positional relationship between the first and second lens group unit 1A and the third lens group 1B, which is detected by the first lens position-detecting device 9A and the second lens position-detecting device 9B, thereby, it is possible to solve the excessive approaching and the excessive separation between the first and second lens group unit 1A and the third lens group 1B according to an approaching degree or separation degree of the first and second lens group unit 1A and the third lens group 1B.

In the lens driving-control device 100 in the second embodiment, the switching from the lens groups to the first and second lens group unit 1A and the third lens group 1B by the CPU 5B is to adjust the driving speed of the third lens group 1B so that the first and second lens group unit 1A and the third lens group 1B do not further approach when the third lens group 1B exceeds the first predetermined position P1 and approaches the first and second lens group unit 1A which is the objective lens, and adjust the driving speed of the first and second lens group unit 1A so that the first and second lens group unit 1A and the third lens group 1B do not further approach when the third lens group 1B exceeds the second predetermined position close to the first and second lens group unit 1A than the first predetermined position P1 and approaches the first and second lens group unit 1A.

Thereby, if the third lens group 1B to the first and second lens group unit 1A exceeds the first predetermined position P1 and approaches the first and second lens group unit 1A (first approaching step), the first and second lens group unit 1A and the third lens group 1B are prevented from further approaching by adjusting the driving speed of the third lens group 1B, whereas if the third lens group 1B to the first and second lens group unit 1A exceeds the second predetermined position P2 close to the first and second lens group unit 1A than the first predetermined position P1 and approaches the first and second lens group unit 1A (second approaching step), the adjustment of the driving speed is switched to the first and second lens group unit 1A. In this way, the driving speeds of the first and second lens group unit 1A and the third lens group 1B are adjusted by adjusting the driving speed of the first and second lens group unit 1A. In this case, in the first approaching step the driving speed of the third lens group 1B is adjusted, and in the second approaching step the driving speed of the third lens group 1B is held in a speed after adjusted and the driving speed of the first and second lens group unit 1A is adjusted.

Thereby, it is possible to enhance a degree reducing the approaching as a degree of approaching increases.

In the lens driving-control device 100 in the second embodiment, the switching from the lens groups to the first and second lens group unit 1A and the third lens group 1B by the CPU 5B is to adjust the driving speed of the third lens group 1B so that the first and second lens group unit 1A and the third lens group 1B do not further separate when the third lens group 1B exceeds the third predetermined position P2 and separates from the first and second lens group unit 1A, and adjust the driving speed of the first and second lens group unit 1A so that the first and second lens group unit 1A and the third lens group 1B do not further separate when the third lens group 1B exceeds the fourth predetermined position L2 remote from the first and second lens group unit 1A than the third predetermined position P2 and separates from the first and second lens group unit 1A.

Thereby, if the third lens group 1B to the first and second lens group unit 1A exceeds the third predetermined position P2 and separates from the first and second lens group unit 1A (first separation step), the first and second lens group unit 1A and the third lens group 1B are prevented from further separating by adjusting the driving speed of the third lens group 1B, whereas if the third lens group 1B to the first and second lens group unit 1A exceeds the fourth predetermined position L2 close to the first and second lens group unit 1A than the third predetermined position P2 and separates from the first and second lens group unit 1A (second separation step), the adjustment of the driving speed is switched to the first and second lens group unit 1A. In this way, the driving speeds of the first and second lens group unit 1A and the third lens group 1B are adjusted by adjusting the driving speed of the first and second lens group unit 1A. In this case, in the first separation step the driving speed of the third lens group 1B is adjusted, and in the second separation step the driving speed of the third lens group 1B is held in a speed after adjusted and the driving speed of the first and second lens group unit 1A is adjusted. Thereby, it is possible to enhance a degree reducing the separation as a degree of separation increases.

In the lens driving-control device 100 according to the second embodiment of the present invention, because the driving speed of the second motor 4B varies depending on an input pulse rate, the driving speed of the third lens group 1B can be adjusted by a simple operation of varying the driving pulse rate input in the second motor 4B only.

In the lens driving-control device 100 according to the second embodiment of the present invention, because the driving speed of the first motor 4A varies depending on an applied driving voltage, the driving speed of the first and second lens group unit 1A can be adjusted by a simple operation of varying the driving voltage applied to the first 4A only.

Meanwhile, the direct-current motor as the first motor 4A to vary the driving speed depending on the applied driving voltage can obtain a speed higher than a pulse motor, if they have the same supplying power, and has a characteristic in which the driving current varies depending on the variation in a load. Therefore, it is possible to withstand the variation of load and obtain smooth operation, because the driving current is increased by the increment of load, resulting in an increment of a driving torque of the motor.

Consequently, such a motor is adequate to drive, for example, a cam cylinder in which an inclination of a cam (load torque) varies depending on a zoom position.

In the lens driving-control device 100 according to the second embodiment of the present invention, because the first motor 4A to drive the first and second lens group unit 1A is the direct-current motor and the second motor 4B to drive the third lens group 4B is the pulse motor, the third lens group 1B can correctly be driven in response to the movement of the first and second lens group unit 1A.

[Third Embodiment]

Figure 14:
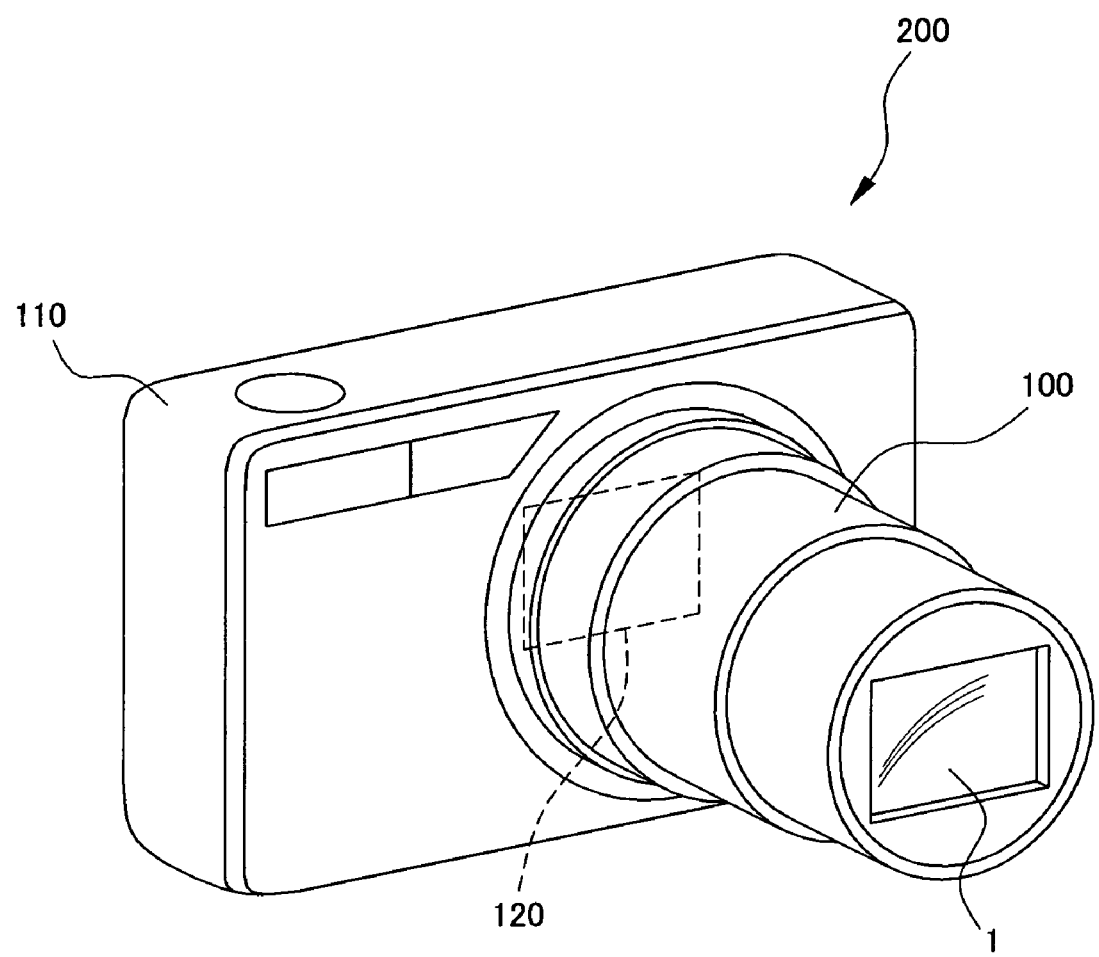
FIG. 14 is a schematic view showing a digital still camera or imaging apparatus according to a third embodiment of the present invention.

FIG. 14 illustrates a digital still camera or imaging apparatus 200 in which a lens driving-control device 100 according to a third embodiment of the present invention is installed.

The illustrated digital still camera 200 includes a two-dimensional CCD (may be a two-dimensional CMOS) 120 as an imaging mechanism which is disposed in a housing 110 and the lens driving-control device 100 which has the photographing lens system 1 and is configured to project an image captured by the photographing lens system 1 on the CCD 120.

The CCD is, also, configured to convert the image projected from the photographing lens system 1 into an electric signal and output the electric signal.

Because the digital still camera 200 includes the lens driving-control device 100 according to the first and second embodiments, the CPU 5B (see a control device in FIG. 1) of the lens driving-control device 100 controls the first motor 4A, the second motor 4B and the third more 4C so that the first and second lens group unit 1A, the third lens group 1B and the fourth lens group 1C are simultaneously driven. Accordingly, it is possible to prevent a required time from the driving initiation to the driving completion of the first and second lens group unit 1A and the third lens group 1B from lengthening, compared with a conventional lens driving-control device in which the first and second lens group unit 1A and the third lens group 1B are progressively driven.

The first and second lens group unit 1A, the third lens group 1B and the fourth lens group 1C are prevented from interfering by controlling the first motor 4A, the second motor 4B and the third motor 4C by the CPU 5B to adjust the driving speeds of the first and second lens group unit 1A, the third lens group 1B and the fourth lens group 1C so that the first and second lens group unit 1A, the third lens group 1B and the fourth lens group 1C do not interfere.

The CPU 5B switches the lens groups in which the driving speed is to be adjusted to the first and second lens group unit 1A and the third lens group 1B based on the positional relationship between the first and second lens group unit 1A and the third lens group 1B, which is detected by the first lens position-detecting device 9A and the second lens position-detecting device 9B, thereby, it is possible to solve the excessive approaching and the excessive separation between the first and second lens group unit 1A and the third lens group 1B according to an approaching degree or separation degree of the first and second lens group unit 1A and the third lens group 1B.

The lens driving-control device in the third embodiment has the same advantageous effects as that in each of the first and second embodiments.

[Industrial Applicability]

Although the lens driving-control device according to the present invention has been applied to an imaging apparatus including a plurality of lens groups and a driving device to drive the lens groups, the lens driving-control device may be applied to drive and control other moving body other than the lens groups.

Although the preferred embodiments of the present invention have been mentioned, the present invention is not limited to these embodiments, various modifications and changes can be made to the embodiments.

The invention claimed is:

1. A lens driving-control device, comprising:
   a plurality of lens groups having variable magnification function;
   a plurality of lens driving devices each of which being configured to adjustably drive a driving speed of each of the plurality of lens groups;
   a control device configured to control each of the plurality of lens driving devices to adjust the driving speed of each of the plurality of lens groups; and
   a plurality of lens position-detecting devices each of which being configured to detect a position of each of the plurality of lens groups,
   wherein when the plurality of lens driving devices drive the plurality of lens groups simultaneously, the control device is configured to control the driving speeds of the lens driving devices by switching the driving speeds based on a positional relationship among the plurality of lens groups, the positional relationship being detected by the lens position-detecting devices, and the positional relationship indicating a distance between adjacent lens groups,
   wherein the control device is configured to, when an other lens group with respect to a subject side-lens group of the plurality of lens groups exceeds a first predetermined position in approaching the subject side-lens group, adjust a driving speed of the other lens group so that the subject side-lens group and the other lens group do not further approach, and configured to adjust a driving speed of the subject side-lens group so that the subject side-lens group and the other lens group do not further approach when the other lens group exceeds a second predetermined position, which is closer to the subject side-lens group than the first predetermined position, in approaching the subject side-lens group.

2. The lens driving-control device according to claim 1, wherein a driving speed of each of the lens driving devices is changed depending on an input pulse rate.

3. The lens driving-control device according to claim 1, wherein a driving speed of each of the lens driving devices is changed depending on an applied driving voltage.

4. The lens driving-control device according to claim 1, wherein a driving speed of each of the lens driving devices is changed depending on a duty ratio.

5. The lens driving-control device according to claim 1, wherein a lens driving device for the subject side-lens group is a direct-current motor and a lens driving device for the other lens group is a pulse motor.

6. The lens driving-control device according to claim 5, wherein a driving speed of the direct-current motor is changed depending on a driving voltage applied to the direct-current motor,
   wherein a driving speed of the pulse motor is changed depending on a pulse rate input to the pulse motor.

7. The lens driving-control device according to claim 5, wherein a driving speed of the direct-current motor is changed depending on a duty ratio to the direct-current motor,
   wherein a driving speed of the pulse motor is changed depending on a pulse rate input to the pulse motor.

8. An imaging apparatus, comprising;
   a case;
   a photographic mechanism provided in the case; and
   the lens driving-control device as recited in claim 1, which is provided in the case.

9. A lens driving-control device, comprising:
   a plurality of lens groups having variable magnification function;
   a plurality of lens driving devices each of which being configured to adjustably drive a driving speed of each of the plurality of lens groups;
   a control device configured to control each of the plurality of lens driving devices to adjust the driving speed of each of the plurality of lens groups; and
   a plurality of lens position-detecting devices each of which being configured to detect a position of each of the plurality of lens groups,
   wherein when the plurality of lens driving devices drive the plurality of lens groups simultaneously, the control device is configured to control the driving speeds of the lens driving devices by switching the driving speeds based on a positional relationship among the plurality of lens groups, the positional relationship being detected by the lens position-detecting devices, and the positional relationship indicating a distance between adjacent lens groups,
   wherein the control device is configured to, when an other lens group with respect to a subject side-lens group of the plurality of lens groups exceeds a third predetermined position in separating from the subject side-lens group, adjust a driving speed of the other lens group so that the subject side-lens group and the other lens group do not further separate, and configured to adjust a driving speed of the subject side-lens group so that the subject side-lens group and the other lens group do not further separate when the other lens group exceeds a fourth predetermined position, which is farther from the subject side-lens group than the third predetermined position, in separating from the subject side-lens group.

10. A lens driving-control device, comprising:
   a plurality of lens groups having variable magnification function;
   a plurality of lens driving devices each of which being configured to drive each of the plurality of lens groups;
   a control device configured to control the plurality of lens driving devices to adjust a driving speed of at least one of the plurality of lens groups;
   a plurality of lens position-detecting devices each of which being configured to detect a position of each of the plurality of lens groups; and a temperature-detecting device configured to measure a circumferential temperature, wherein when the plurality of lens driving devices simultaneously drive the plurality of lens groups, the control device is configured to vary a driving speed-adjustment limiting value, which is an available value corresponding to a maximum driving speed of the plurality of lens groups, based on a measured result of the temperature-detecting device when adjusting the driving speed depending on a positional relationship among the plurality of lens groups detected by the lens position-detecting devices.

11. The lens driving-control device according to claim 10, wherein if the measured result of the temperature-detecting device is a low-temperature determining threshold or less, the adjustment of the driving speed of the at least one lens group is prohibited.

12. The lens driving-control device according to claim 10, wherein if an interval between the plurality of lens groups decreases a predetermined value or less, the adjustment of the driving speed of the at least one lens group is executed regardless of the measured result of the temperature-detecting device, wherein if an interval between the plurality of lens groups separates a predetermined value or more, the adjustment of the driving speed of the at least one lens group is prohibited in a case where the measured result of the temperature-detecting device is a low-temperature determining threshold or less.

13. The lens driving-control device according to claim 10, wherein if a driving speed of each of the lens driving devices is changed depending on an input pulse rate, the driving speed-adjustment limiting value is the maximum pulse rate.

14. The lens driving-control device according to claim 10, wherein if a driving speed of each of the lens driving devices is changed depending on an applied driving voltage, the driving speed-adjustment limiting value is the minimum driving voltage.

15. The lens driving-control device according to claim 10, wherein if a driving speed of each of the lens driving devices is changed depending on a duty ratio, the driving speed-adjustment limiting value is the minimum duty ratio.

16. The lens driving-control device according to claim 10, wherein a lens driving device for a subject side-lens group of the plurality of lens groups is a direct-current motor and lens driving devices for the other lens groups are pulse motors.

17. The lens driving-control device according to claim 16, wherein a driving speed of the direct-current motor is changed depending on a driving voltage applied to the direct-current motor, wherein a driving speed of each of the pulse motors is changed depending on a pulse rate input to each of the pulse motors.

18. The lens driving-control device according to claim 16, wherein a driving speed of the direct-current motor is changed depending on a duty ratio to the direct-current motor, wherein a driving speed of each of the pulse motors is changed depending on a pulse rate input to each of the pulse motors.

19. An imaging apparatus, comprising;

a case;

a photographic mechanism provided in the case; and the lens driving-control device as recited in claim 10, which is provided in the case.

* * * * *